United States Patent
Dimitrov

(10) Patent No.: US 8,826,141 B2
(45) Date of Patent: Sep. 2, 2014

(54) IMAGE-BASED AND PREDICTIVE BROWSING

(75) Inventor: Stefan Dimitrov, Winnipeg (CA)

(73) Assignee: BlackBerry Limited, Waterloo (CA)

( * ) Notice: Subject to any disclaimer, the term of this patent is extended or adjusted under 35 U.S.C. 154(b) by 302 days.

(21) Appl. No.: 12/713,983

(22) Filed: Feb. 26, 2010

(65) Prior Publication Data

US 2011/0202847 A1    Aug. 18, 2011

Related U.S. Application Data

(60) Provisional application No. 61/303,957, filed on Feb. 12, 2010.

(51) Int. Cl.
   *G06F 3/14*        (2006.01)
(52) U.S. Cl.
   USPC ............ 715/738; 715/700; 705/2; 705/14.55; 709/202; 709/211
(58) Field of Classification Search
   USPC .......... 715/200–277, 700–867; 700/701–866; 709/201–229; 705/2, 14.55, 50–79; 345/30–111; 348/206–231.9; 707/200–206; 1/1
   See application file for complete search history.

(56) References Cited

U.S. PATENT DOCUMENTS

| | | | |
|---|---|---|---|
| 5,778,372 A | 7/1998 | Cordell et al. | |
| 6,023,726 A | 2/2000 | Saksena | |
| 6,356,908 B1 | 3/2002 | Brown et al. | |
| 6,529,936 B1 * | 3/2003 | Mayo et al. ................... | 709/202 |
| 7,055,095 B1 | 5/2006 | Anwar | |
| 7,290,006 B2 * | 10/2007 | Xie et al. ............................. | 1/1 |
| 2002/0178232 A1 * | 11/2002 | Ferguson ..................... | 709/217 |
| 2004/0255003 A1 | 12/2004 | Tecu et al. | |
| 2006/0048051 A1 | 3/2006 | Lazaridis | |
| 2007/0263007 A1 | 11/2007 | Robotham et al. | |
| 2007/0299830 A1 | 12/2007 | Muenchhoff et al. | |
| 2008/0222273 A1 | 9/2008 | Lakshmanan et al. | |
| 2009/0106698 A1 | 4/2009 | Hansen et al. | |

(Continued)

OTHER PUBLICATIONS

Gandhi, R. et al., "Domain name based visualization of web histories in a zoomable user interface", Database and Expert Systems Applications, 2000. Proceedings. 11th International Workshop on, IEEE, Los Alamitos, CA, USA, Sep. 4, 2000, pp. 591-598, XP010515553.

(Continued)

*Primary Examiner* — Ruay Ho
(74) *Attorney, Agent, or Firm* — Jenna L. Wilson; Dimock Stratton LLP

(57) ABSTRACT

Systems and methods are provided for image-based browsing of resources, such as webpages, on a communication device, providing for image-based navigation of recently accessed resources and image-based selection of resources matching partial or complete address strings entered in an input field. Also provided are systems and methods for predictive loading of resources, by detecting browsing actions such as zooming in and hovering over thumbnail images of previously accessed resources, and initiating HTTP requests for those resources over a network before receipt of an express command to retrieve the resource. To improve the user-perceived responsiveness of the device to commands to download and display resources such as webpages comprising embedded objects, the order of requesting updated versions of the embedded objects is determined by analysis of the portion of the webpage of interest to the user. Prioritizing of various browser-related tasks is also disclosed.

19 Claims, 13 Drawing Sheets

(56) References Cited

U.S. PATENT DOCUMENTS

| | | | |
|---|---|---|---|
| 2009/0210806 | A1 | 8/2009 | Dodson et al. |
| 2009/0217145 | A1 | 8/2009 | Watson |
| 2009/0265420 | A1 | 10/2009 | Hanson et al. |
| 2011/0125521 | A1* | 5/2011 | Dhoble .............................. 705/2 |
| 2011/0264527 | A1* | 10/2011 | Fitzpatrick et al. ........ 705/14.55 |

OTHER PUBLICATIONS

Extended European Search Report dated Oct. 12, 2010 from EP10154929.3.
Li, J. and Sun, H. H "On interactive browsing of large images", IEEE Trans. On Multimedia: MM10352, 2003, pp. 1-23.
Javascribe (pseudonym), "javascribing(): Mouseover prefetching" (Nov. 9, 2009), accessed Nov. 29, 2009, http://my.opera.com/javascribe/blog/show.dml/4498889, 1 pg.
Dahlan, A. A., Nishimura, T., "Implementation of asynchronous predictive fetch to improve the performance of Ajax-enabled web applications", iiWAS2008, Nov. 24-28, 2008, Linz, Austria, pp. 345-350.
Trapani, G., "A hands on look at Safari 4's (Crashy) Eye Candy", Lifehacker, Observation of Safari 4.03, Mac OSX (similar features with Chrome, IE), accessed Nov. 28, 2009, http://lifehacker.com/5159907/a-hands-on-look-at-safari-4s-crashy-eye-candy, pp. 1-5.
Cooliris, Inc., CoolPreviews 2.7.6 installed on Firefox 2, Mac OSX, accessed Nov. 28, 2009, http://www.coolpreviews.com/, 2 pgs.
Jiang, J., Kleinrock, L., "An Adaptive Network Prefetch Scheme", IEEE 1998, pp. 1-25.
Davidson, B. D., "Predicting Web Actions from HTML Content" HT'02, Jun. 11-15, 2002, 10 pgs.
Fisher, D., Saksena, G., "Link Prefetching in Mozilla: A Server-Driven Approach", Netscape/AOL 2002, 6 pgs.
Fisher, D., "Mozilla Developer Center: Link Prefetching FAQ" (2003), accessed Nov. 29, 2009, https://developer.mozilla.org/en/Link_prefetching_FAQ, 6 pgs.
Terry, D. B., Ramasubramanian, V., "Caching XML Web Services for Mobility", ACM Queue, May 2003, pp. 70-78.
Duchamp, D., "Prefetching Hyperlinks", Proceedings of USITS '99: The 2nd USENIX Symposium on Internet Technologies & Systems, Oct. 11-14, 1999, 13 pgs.
Palmgoon.com, "Meet the Web Browser on the Pre", accessed Nov. 28, 2009, http://palmgoon.com/meet-the-web-browser-on-the-pre/, 6 pgs.
Johnson, B., Dayal, R., "Automatic Compile-Time Image Bundling", ImageBundleDesign—Google Web Toolkit, accessed Nov. 29, 2009, http://code.google.com/p/google-web-toolkit/wiki/ImageBundleDesign, pp. 1-5.
Benson, E., "Haystack Blog: How Safari and Firefox handle HTML 5 Manifest files" (Sep. 26, 2009), accessed, Nov. 28, 2009, http://groups.csail.mit.edu/haystack/blog/, pp. 1-6.
Grieve, A., "Google Code Blog: Gmail for Mobile HTML5 Series: Using AppCache to Launch Offline—Part 1" (Apr. 28, 2009), accessed Nov. 28, 2009, http://googlecode.blogspot.com/2009/04/gmail-for-mobile-html5-series-using.html.
W3C, "HTML 5: 6.9 Offline Web applications" (revision 1.2852), accessed Nov. 28, 2009, http://www.w3.org/TR/html5/offline.html#concept-appcache-ma, pp. 1-25.
Google code, "Page Speed: Optimize Browser Rendering" (2009), accessed Nov. 29, 2009, http://code.google.com/speed/page-speed/docs/rendering.html, pp. 1-6.
Hyatt, D., "Webkit WebCore Rendering", accessed Nov. 28, 2009, http://trac.webkit.org/wikiWebCoreRendering, p. 1.
Hyatt, D., "Surfin' Safari: WebCore Rendering I—The Basics" (Aug. 8, 2007), accessed Nov. 28, 2009, http://webkit.org/blog/114/webcore-rendering-i-the-basics/, pp. 1-4.
Koivisto, A., "Surfin' Safari: Optimizing page loading in the web browser" (Mar. 23, 2008), accessed Nov. 29, 2009, http://webkit.org/blog/166/optimizing-page-loading-in-web-browser/, pp. 1-6.
Pearl Crescent Page Saver Basic (Firefox Add-On), accessed Nov. 29, 2009, https://addons.mozilla.org/en-US/firefox/addon/10367, pp. 1-5 (best available copy).
Snap.com (browser add-on and web developer tool), accessed May 21, 2010, http://www.snap.com/snapshots.php, p. 1.
Bromberg, P., "Build a Self-Caching ASP.Net Web Site Thumbnail Control", accessed Nov. 29, 2009, eggheadcafe.com, (Article re Web Developer tool), pp. 1-13.
"Palm Pre vs. iPhone 3G vs. Blackberry Storm", http://www.youtube.com/watch?v=plzr2cdQywk (Flash video), 2 pgs.
Brank, J. et al., "Predictive Algorithms for Browser Support of Habitual User Activities on the Web", Nov. 18, 2004, Microsoft Research. Accessed May 25, 2010, http://research.microsoft.com/apps/pubs/default.aspx?id=70111, 11 pgs.
Ajax Patterns, "Predictive Fetch", accessed May 25, 2010, http://ajaxpatterns.org/Predictive_Fetch, 6 pgs.
Mozilla Labs Forum Archive, "Concept Series: Predictive browsing", accessed May 25, 2010, https://mozillalabs.com/forum/comments.php?DiscussionID=141, 2 pgs.
Dolcourt, J. "Skyfire mobile browser updates, gets predictive", accessed May 25, 2010, http://download.cnet.com/8301-2007_4-9933397-12.html, 2 pgs.

* cited by examiner

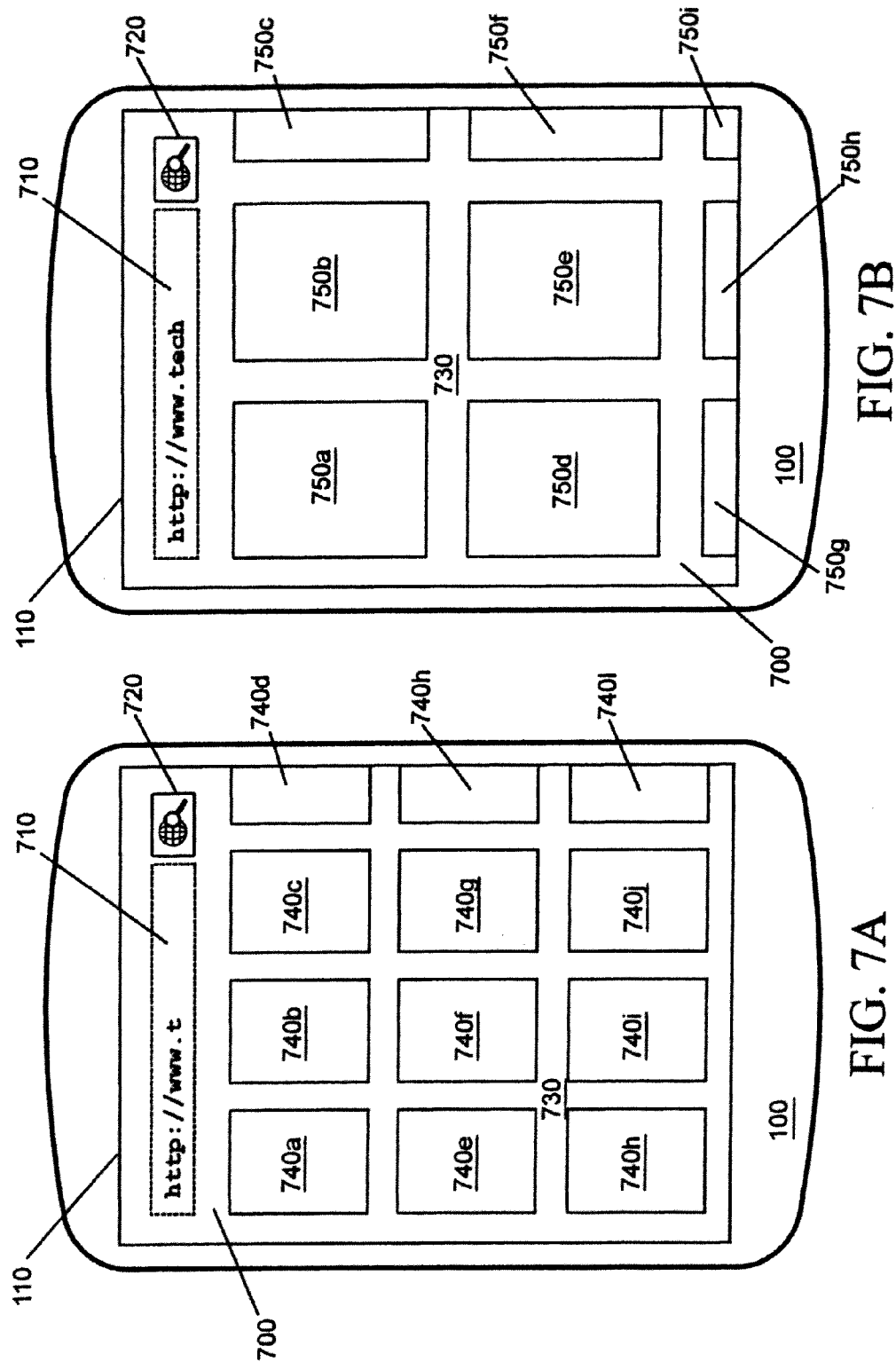

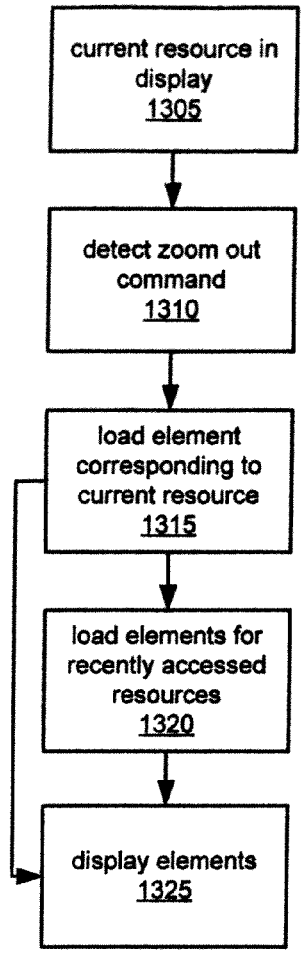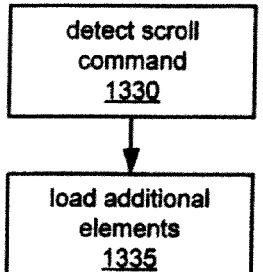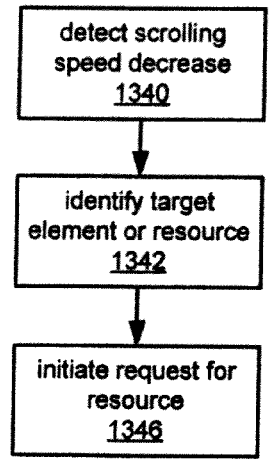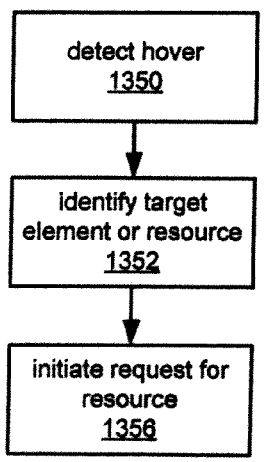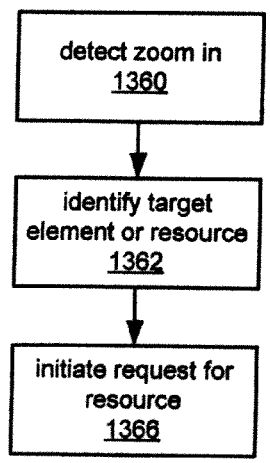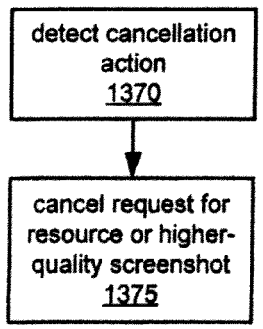
FIG. 13A
FIG. 13B
FIG. 13C
FIG. 13D
FIG. 13E
FIG. 13F

IMAGE-BASED AND PREDICTIVE BROWSING

REFERENCE TO PRIOR APPLICATIONS

This application claims priority from U.S. Application No. 61/303,957, filed Feb. 12, 2010.

BACKGROUND

1. Technical Field

The present invention relates generally to retrieving content using a browser application, and specifically to predictive retrieval and display of webpage content.

2. Description of the Related Art

Because webpages, and in particular images or other objects embedded within the pages, are typically downloaded only in response to a user command to download the webpage for display using a client application, the user may experience a delay between the time the command is issued and the time the page is rendered on the display of the client device. This is particularly inconvenient when the data transfer rate between the server and the client device is slow, or when the files to be downloaded to the client device are large. To improve response time, the client application may load cached data in response to the user's command to download the webpage. The cached data would have been stored at the client device the last time the webpage was accessed. However, while the user may experience reduced response time, the data rendered and displayed to the user may be obsolete, since it may have been updated at the server after it was last accessed by the client device, requiring download of the entire webpage and all associated content afresh. However, this results in a delay detrimental to the user's experience.

In addition, over the course of a user's browsing history using a web browser or similar application, the user may have accessed a large number of pages or resources. The web browser may temporarily store a list of the addresses accessed by the user. When the user wishes to access a resource he or she had previously visited, the list of addresses may be viewed and the appropriate address selected. However, the user may not recall the correct address; even if the user is able to recall a portion of the address, many previously visited resources may have similar addresses, making it difficult for the user to pick out the correct address without some trial and error. It is therefore desirable to provide systems and methods providing improved user experience in browsing, accessing, and identifying resources using a client application such as a web browser.

BRIEF DESCRIPTION OF THE DRAWINGS

In drawings which illustrate by way of example only embodiments of the present invention.

FIGS. 7A, 7B and 7C are schematic representations of user interfaces displaying interface elements relating to previously accessed resources on the client communication device of FIG. 5A.

FIGS. 13A and 13B are flowcharts depicting methods for loading and displaying interface elements in the user interfaces of FIGS. 9 and 10.

FIGS. 13C to 13E are flowcharts depicting methods for initiating a request for a resource in response to a browsing action.

FIG. 13F is a flowchart depicting a method for cancelling the request of one of FIGS. 13C to 13E.

DETAILED DESCRIPTION

The embodiments described herein provide a system and method for enhanced caching, retrieval, and display of content served to a client device from one or more remote servers. These embodiments will be described in relation to a client communication device, such as a mobile communication device, having a display for displaying content within a graphical user interface. It will be appreciated by those skilled in the art, however, that this description is not intended to limit the scope of the described embodiments to mobile communication devices. The methods and systems described herein may be applied to any appropriate communication or data processing device capable of communicating over a network, whether portable or wirelessly enabled or not, including without limitation cellular phones, smartphones, wireless organizers, personal digital assistants, desktop computers, terminals, laptops, tablets, handheld wireless communication devices, wirelessly-enabled notebook computers and the like.

Figure 1:
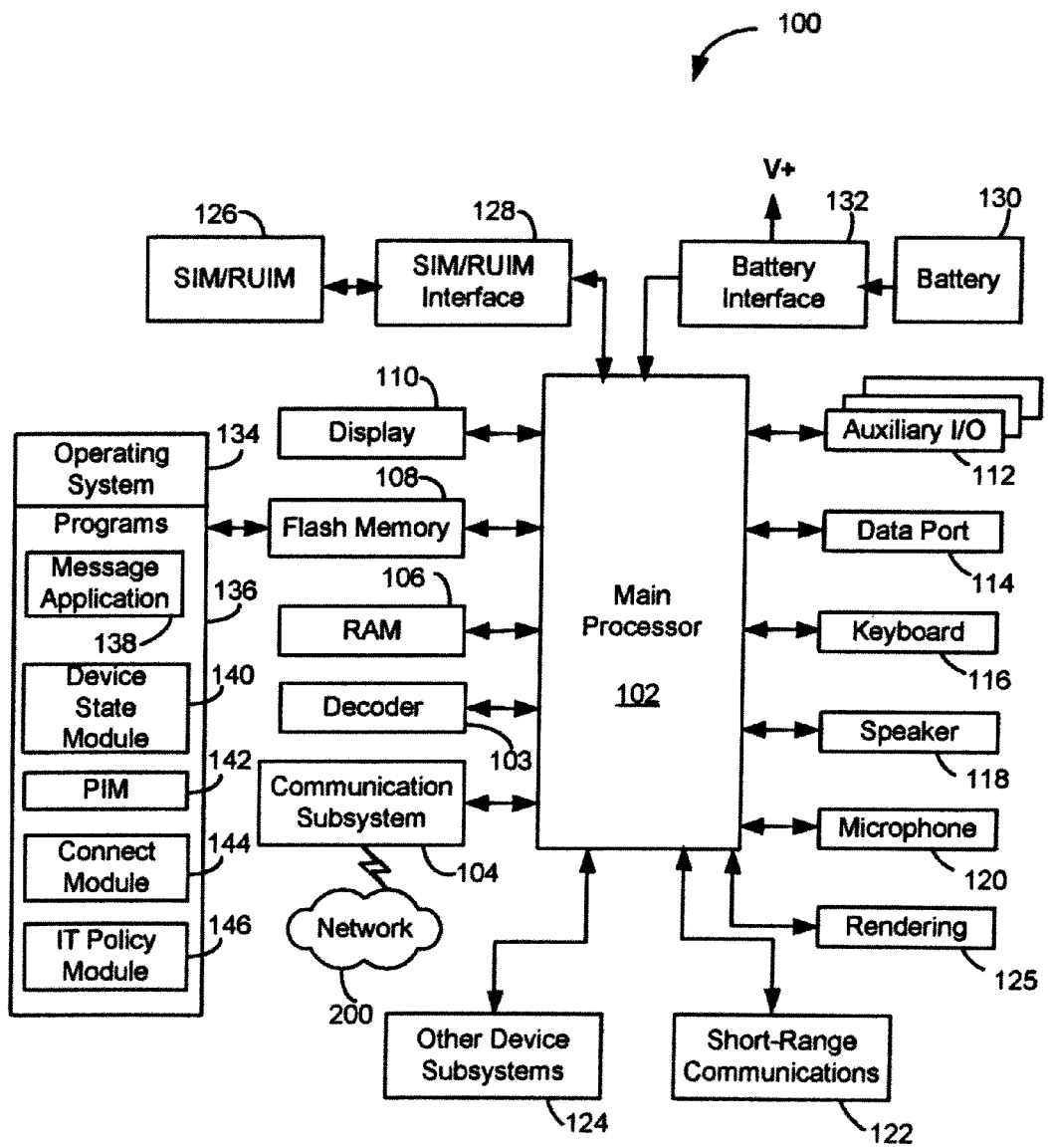
FIG. 1 is a block diagram of an embodiment of a mobile device.
Figure 2:
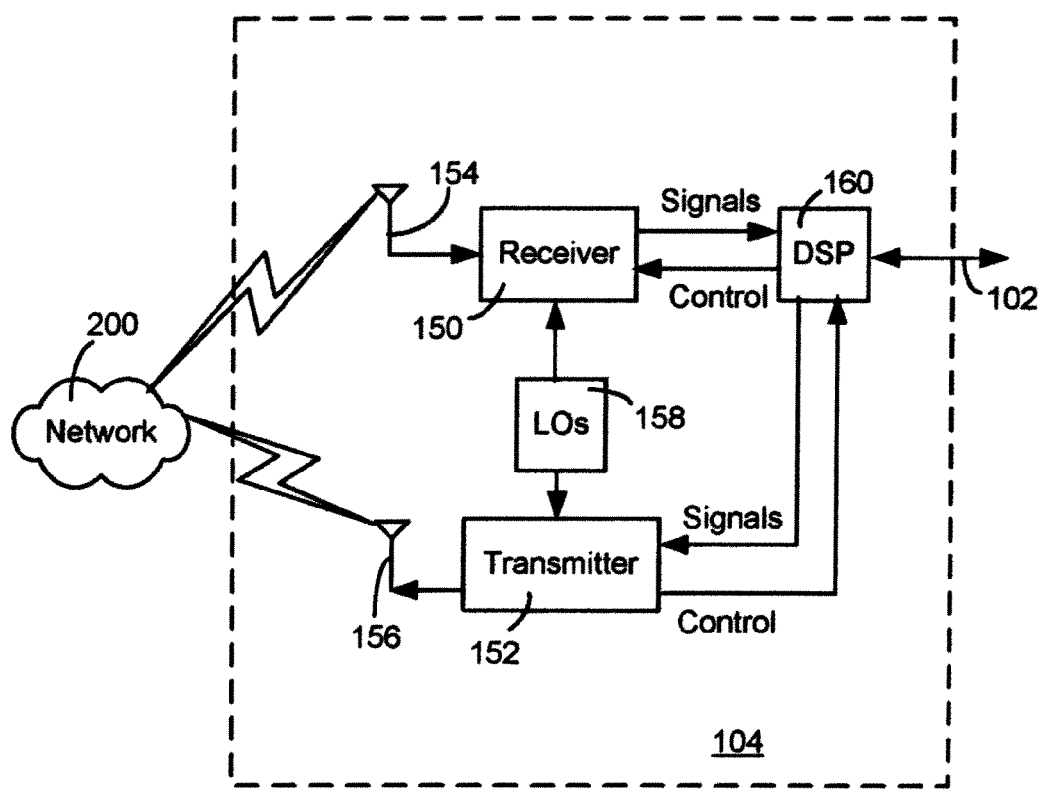
FIG. 2 is a block diagram of an embodiment of a communication subsystem component of the mobile device of FIG. 1.
Figure 3:
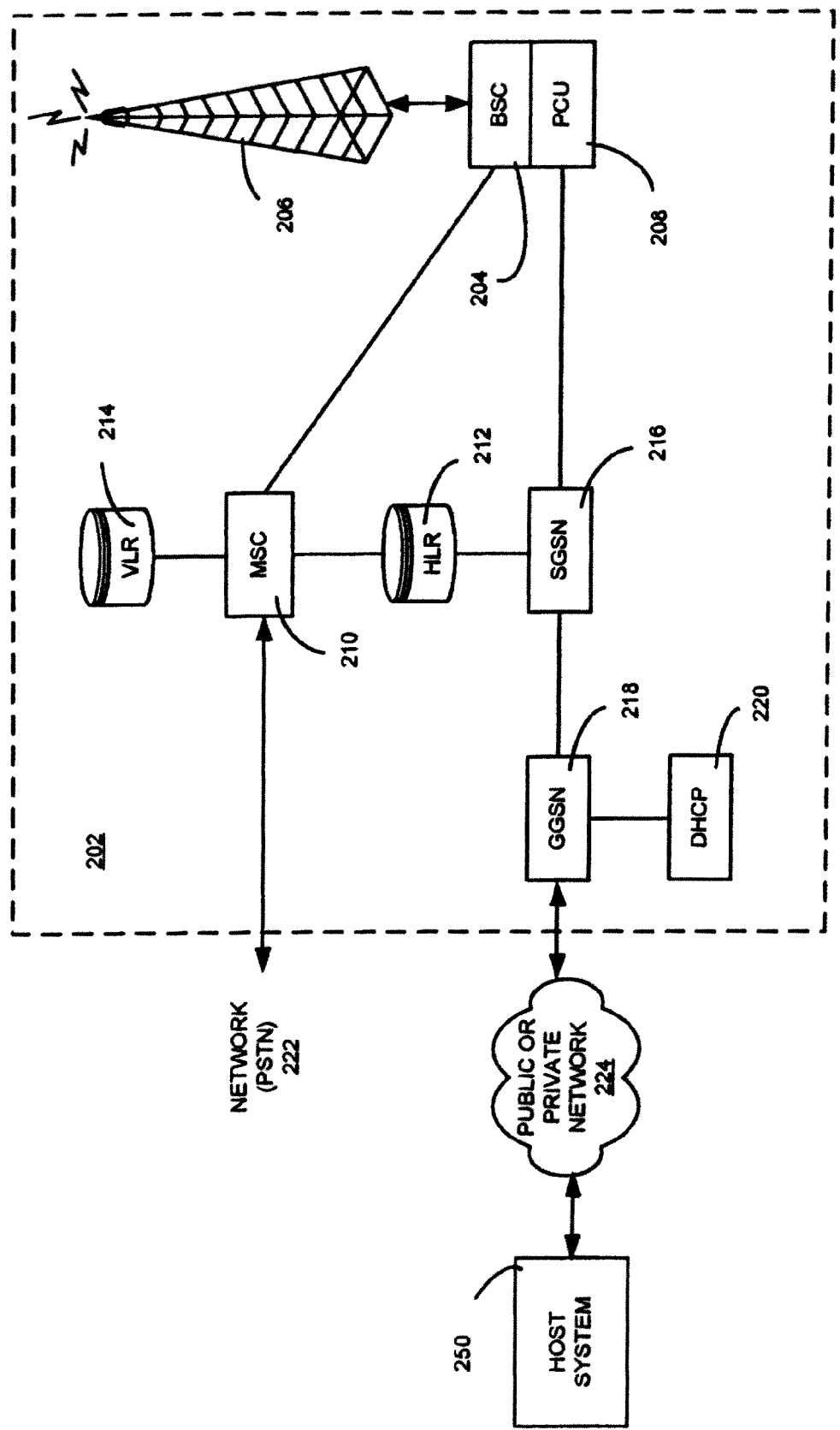
FIG. 3 is an exemplary block diagram of a node of a wireless network for use with the mobile device of FIG. 1.
Figure 4:
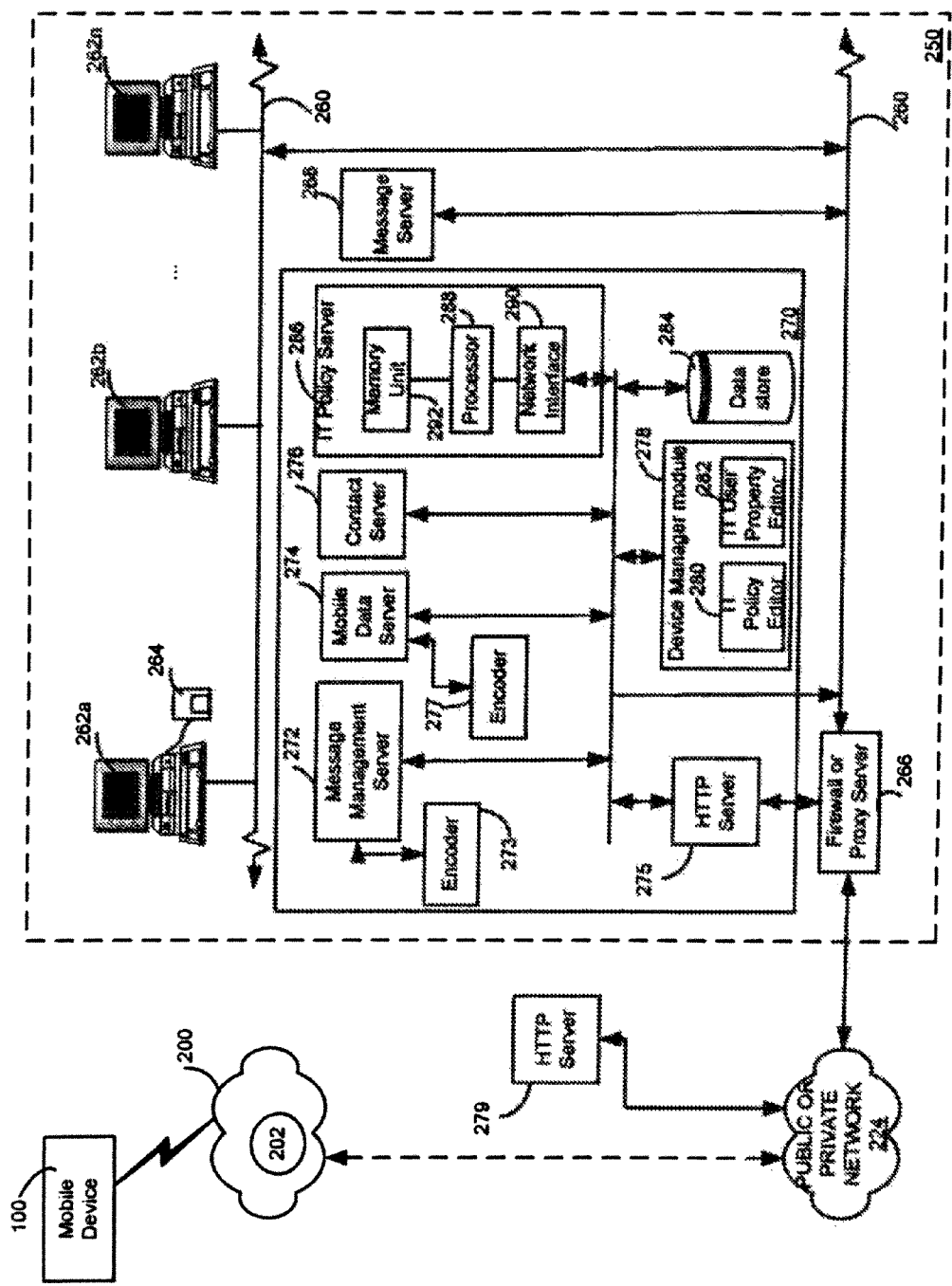
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS. Some other examples of data-centric networks include WiFi 802.11™, LTE, WiMax, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering or layout circuit or engine 125 is included in the device 100. When a user specifies that a data file is to be viewed on the display 110, the rendering circuit or engine 125 analyzes and processes the data file for visualization on the display 110. Rendering circuit or engine 125 may be implemented as hardware, software, or as a combination of both hardware and software.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information form mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's communication device 100 is situated on a LAN connection. The cradle 264 for the communication device 100 can be coupled to the computer 262*a* by a serial or a Universal Serial Bus (USB) connection, for example. Other user computers 262*b*-262*n* are also situated on the network 260, and each can be equipped with an accompanying cradle 264. The cradle 264 facilitates the loading of information (e.g. PIM data, private symmetric encryption keys to facilitate secure communications) from the user computer 262*a* to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262*a*-262*n* are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26× and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274 and encoder 273 for message management server 272, it will be appreciated that each of message server 268 and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Rendering data files originally optimized or prepared for visualization on large-screen displays on a portable electronic device display often requires additional processing prior to visualization on the small-screen portable electronic device displays. According to an embodiment, this additional processing is accomplished by the rendering engine 125 shown in FIG. 1. As will be appreciated by those of skill in the art, the rendering engine can be implemented in hardware, software, or a combination thereof, and can comprise a dedicated image processor and associated circuitry, or can be implemented within main processor 102.

The embodiments described herein are described in the context of a client communication device and client browser application in communication with a service over a network. As discussed above, the communication device 100 may receive data relating to a resource from an external web server or other server from the mobile data server 274 of FIG. 4, which in turn is connected to a public network such as the Internet via the HTTP server 275 such that it is in communication with the external web server or other server. The receipt of data from an external server may bypass the mobile data server 274, and data may instead be received from an HTTP server 279 external to the host network. Regardless of the means by which the resource is received by the client device 100 for display, the resource received from a server over the network 224 may be rendered by the rendering engine 125 for display on the client device's display 110.

The resource may be delivered in a structured format; for example, the resource may comprise a video, graphic, or text; or, it may be delivered as a webpage document or other document authored in hypertext markup language (HTML) or in another structured markup language. The resource may comprise or be rendered in conjunction with scripts, dynamic content, presentation markup, style sheets, or other programming content that is processed within the environment provided by a client application executing on the device 100. The client application may be a web browser or other content viewer for displaying the resource. The construction of HTML web pages and other structured content with enabled and focusable elements using known structural and presentation standards such as HTML 4.01, XHTML 1.0, HTML 5, DOM Levels 1 through 3, and CSS Levels 1 through 3, published by the World Wide Web Consortium (W3C) at w3.org, will be known to those skilled in the art. The resource may comprise or be associated with elements such as JavaScript published by the Mozilla Foundation, Mountain View, Calif., www.mozilla.org; Adobe Flash technologies from Adobe Systems Incorporated, San Jose, Calif.; video files in any one of various compatible formats, including Flash, Quicktime, MPEG and in particular MPEG-4; dynamic HTML technology, widgets, modules, code snippets, and the like, which may be delivered together with the resource to the client device 100, or which alternatively may be downloadable separately by the client application, progressively downloaded, or streamed from the server for use with the resource. The selection and implementation of these and other suitable existing and future structural or presentation standards, various elements, scripting or programming languages and their extensions, will be known to those of skill in the art.

The resource may be received at the client device 100 in response to a user command received via the client application to request the resource from a web server; for example, in a browser application, the user may click on or otherwise actuate a hyperlink contained in web page content displayed on the device 100, with the result that the browser application constructs and transmits an HTTP request for the resource identified by the uniform resource indicator contained in the hyperlink. Alternatively, the resource may be received in response to another type of request or query, such as an application programming interface call to a server. For ease of reference, the embodiments below will be described in the context of a resource comprising a webpage 500 and its content, which may contain various embedded objects such as images, video files, and the like as described above, and a browser client application. It will be appreciated by those skilled in the art, however, that the embodiments described herein may also apply to different types of content received at the client device 100.

Figure 5B:
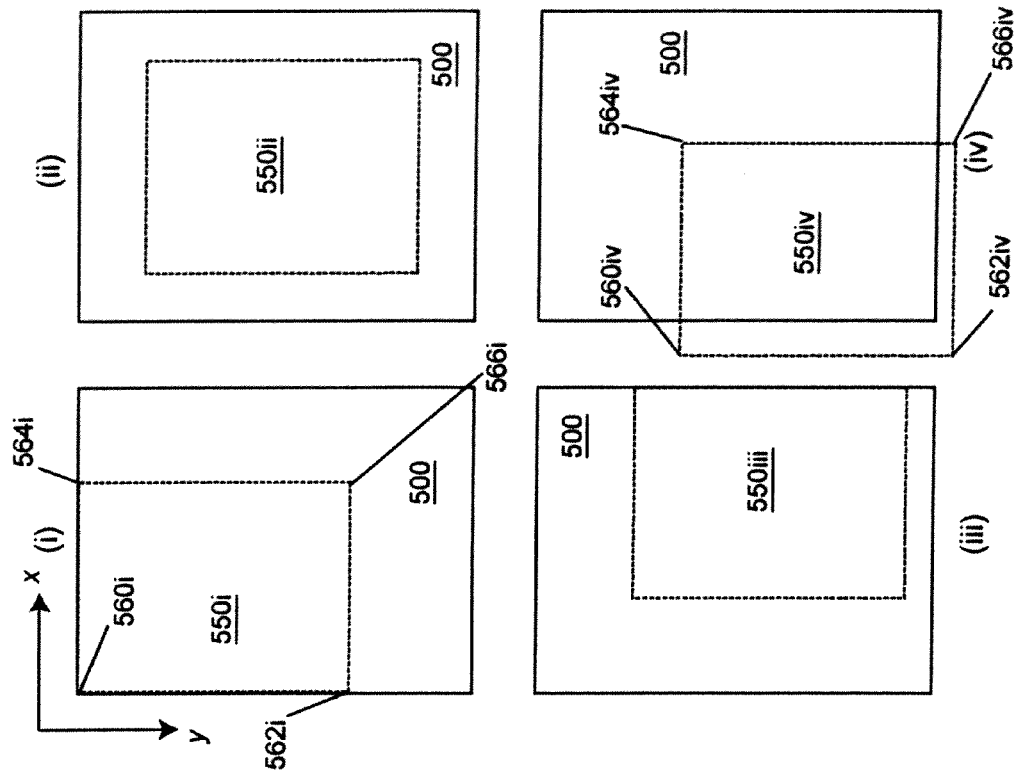
FIG. 5B is a schematic representation of viewable regions of the resource of FIG. 5A.
Figure 5A:
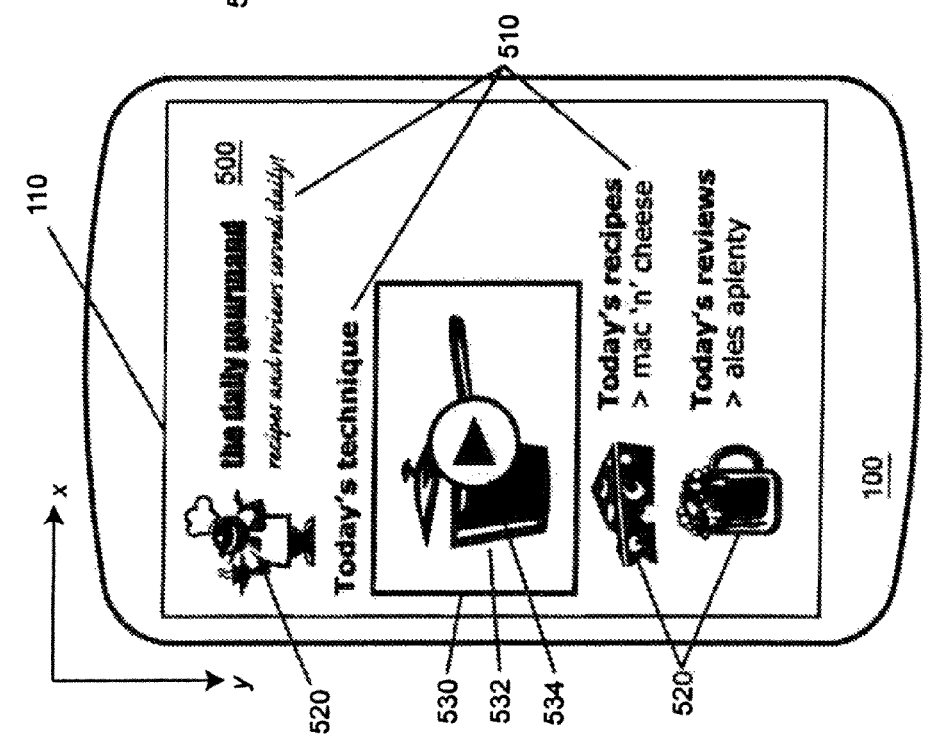
FIG. 5A is an illustrative embodiment of a resource displayed on a client communication device.

Turning to FIG. 5A, a simple example of a webpage 500 rendered for display in the display 110 of a client device 100 is shown. As will be understood by those of ordinary skill in the art, the webpage 500 may comprise a structured HTML document that is parsed by a rendering or layout engine 125, optionally integrated with the client browsing application, for rendering in the display 110 using techniques known in the art. The webpage 500 represented in FIG. 5A includes hyperlink and text content 510, an embedded image 520, and embedded video content 530. The video content 530, as mentioned above, may be downloaded or streamed to the client device 100. The video content 530, when first displayed on the display 110, may be represented by a still image 532 and user interface control 534 that are initially downloaded and rendered on the display. The user interface control 534 may be actuated by the user to start playback of a portion of the video content 530 downloaded thus far.

Regardless of the content of the webpage 500, the client application or operating system 134 of the client device 100 may be configured to obtain and store image data representative of the downloaded and rendered content of the webpage 500, often referred to a "screenshot". This screenshot may be a file containing raw image data representing the data generated by the rendering or layout engine 125 after receipt of the webpage 500, for display on the client device's display 110.

The stored image data may reflect the data rendered only for immediate display on the display 110. If the webpage 500 comprises content that, once rendered at normal or full size, does not fit within a single view on the display 110, then the captured and stored screenshot data may relate only to that portion of the webpage 500 that is initially viewable on the display 110. This is illustrated in FIG. 5B(i), which depicts a viewable area 550i of the webpage 500 that may be initially displayed on the display 110 once the webpage 500 is downloaded to the client device 100. The viewable area 550i corresponds to the area of the display 110. The user may navigate through the webpage 500, or alternatively the webpage 500 may be processed by the client application for rendering on the display 110, such that a different portion of the webpage 500 is displayed on the client display 110. Alternative examples are shown in FIG. 5B(ii), (iii), and (iv), in which the centre 550ii, lower right-hand side 550iii, and a portion of the lower left-hand side 550iv of the rendered webpage 500 are defined as the viewable areas of the page 500. The operating system 134 or the client application may thus be configured to obtain and store image data, or screenshot, relating only to these viewable areas 550i, 550ii, 550iii, or 550iv as they would be rendered for display on the display 110.

Alternatively, the operating system 134 or the client application may be configured to obtain and store image data relating to the entirety of the webpage 500 and its displayable embedded content, whether or not the entirety of the webpage 500 is displayable at once at normal size on the display 110. Thus, the screenshot may represent the entirety of the webpage 500 as it would be rendered for display on the display 110.

The screenshot data may be captured and stored at the client device 100 at different points. For example, it may be captured and stored as soon as the rendering engine 125 has completed rendering the webpage 500 for display; after the page 500 has been rendered, and after the page 500, or a portion thereof, has been displayed on the display 110; after the webpage 500 has been displayed on the display 110 after a predetermined period of time; upon detection of a user action navigating away from the current view of the webpage 500 on the display (for example, upon detection that the user had clicked on a hyperlink to request a different page of content, or another use request to load a different webpage); or upon detection of a user action switching to a different application (for example, upon detection that the user had chosen to exit the client application used to view the webpage 500, or invoking a command to switch to another application executing on the device 100). In this last example, the last screenshot may thus be a view of the webpage 500 in its state when it was last viewed by the user.

If the screenshot data for the webpage 500 had been captured and stored earlier, it may be updated at a later point in time; for example, at one of the points listed above. Alternatively or in addition to these points in time, the screenshot data may be updated periodically while the webpage 500 is currently displayed on the device 100. Updating the captured screenshot data may be useful, for example in situations where the content of the webpage 500 is updated while the user is viewing the webpage, or when the screenshot represents only a smaller displayable portion of the entire webpage 500, since the screenshot may therefore reflect the webpage 500 as the user last saw it.

Whenever the screenshot data is captured, it is stored in a memory of the device 100 as described below. The device 100 may, in addition to or in place of storing the full set of data associated with the screenshot, store a reduced file size version that is quicker to load from memory by virtue of its smaller size.

In addition to capturing screenshot data, the operating system 134 or client application may also cause the webpage 500 file itself to be stored in memory on the device 100. The webpage 500 may be stored in memory in addition other data associated with the webpage 500 and downloaded to the client device 100, such as embedded images and other embedded objects. This cached webpage and object data may be updated at points like those identified above for capturing screenshots; the cached data may also be similarly updated after its initial storage in the client device memory.

Figure 6:
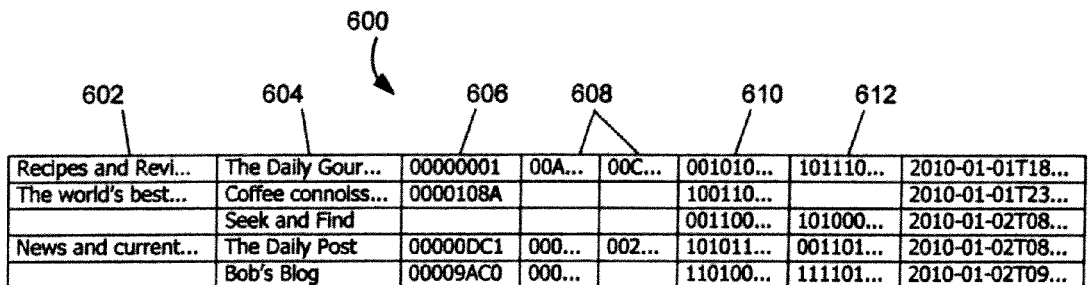
FIG. 6 is a schematic representation of cached data relating to the resource of FIG. 5A.

The screenshot, webpage, and associated object data may be stored in volatile memory, such as RAM 106 as shown in FIG. 1, while the client application used to view the webpage 500 is executing on the device in order to improve performance in loading data in response to user commands. The data may also be stored in persistent memory, such as flash memory 108, for later retrieval by the operating system 134 or the client application. For example, while a current session of the client application is running, the screenshot and other data may be retained in RAM 106. Periodically, the data stored in the RAM 106 may be written to non-volatile memory such as flash memory 108 while the client application is still executing, or alternatively upon application exit. The data may be stored in association with the uniform resource indicator (URI) or other identifier of the webpage 500. The data may be stored in any data structure suitable for use with the client device 100. FIG. 6 depicts a representative array 600 listing the webpage data that may be stored in association with URIs in the flash memory 108. The array may include description data 602, title 604, content 606, associated objects 1 through n 608, screenshot data 610, thumbnail data 612 if generated, and a timestamp 614, which may represent the last visit or viewing of the webpage 500 or screenshot by the user, or the last update of the stored data. The array may also comprise ancillary data, such as the URI associated with the webpage, although in some embodiments the URI may not be comprised in the array itself, but instead used to look up the appropriate array entry such as in a hash table arrangement where the URI is hashed to generate a key for looking up array data. Not all the identified in FIG. 6 may be stored in association with every webpage 500 viewed on the client device 100. The array 600 may comprise the relevant data itself; for example, the content 606 comprised in the array 600 may be the webpage HTML or other resource file itself, or it may be a pointer to a location in memory where the file is stored, and similarly one or more of the other fields 602, 604, 606, 608, 610, and 612 may comprise pointers indicating where the associated data is stored. If the resource is not a webpage 500, but rather another type of document or file, then the data stored in the array may not include all of the elements 602, 604, 606, or 608.

Data may be stored in the persistent memory 108 for every resource downloaded and viewed on the client device 100. To reduce the amount of memory consumed in storing this cached resource data and corresponding screenshots, some or all of the data associated with older resources may be deleted; for example, after the array 600 reaches a predetermined number of entries, or a predetermined size in persistent memory 108, the oldest entries in the array 600 may be deleted, and the associated data deleted from persistent memory. Alternatively, the client device 100 may periodically delete any entries in the array 600 and associated data having a timestamp 614 older than a predetermined date, or may selectively delete the content 606, the screenshot data 610, or the thumbnail data 612 of array 600 entries having a timestamp 614 older than a predetermined date.

Subsequently, the cached resource data, or the screenshot data, may be used to facilitate user navigation. Web browsing applications may store URIs corresponding to webpages selected by the user for inclusion in a bookmark list, or URIs corresponding to the user's browsing history of pages visited over a given period of time. The user may access the bookmark list or browsing history and select a URI from the list, rather than entering the URI directly in the browsing application's address input field. However, URIs are presented in text form, and the user may not recall the URI of the webpage he or she wishes to access; even if the URIs are stored in association with page titles and descriptions, the user may still not be able to identify the precise webpage he or she wishes to access from that information. For example, a single website may comprise a number of pages, all with similar URIs and descriptions. The user may have to guess at the desired URI, and select and load the webpage addressed by that URI, and may have to repeat this procedure several times before locating the correct page. By using the cached resource data or screenshot data, the user's experience in recalling and accessing previously visited or bookmarked resources may be improved.

In a first embodiment, images of previously visited resources, such as webpages, are presented predictively to the user as the user enters a URI or other resource address, or a title or name identifying the resource, in the client application. FIG. 7A illustrates a user interface 700 in a client application for browsing webpages, such as webpage 500 displayed in the display 110 of the client device 100. The user interface 700 comprises an input field 710, in which an address or title may be input, for example by means of a keyboard or other input subsystem 112. Once an address or title has been entered and a command for retrieving data at the input address actuated (for example, by actuating the virtual command button 720 in the user interface 700, or by the user actuating an "enter" or "return" button on a virtual or physical keyboard), the client application may transmit a request over the network for data located at the entered address. If the entered data is a title or other name identifying the resource, the client application may query a data store at the device 100 to identify an associated address to request the resource over the network, or may initiate a query over the network, such as a search query, to obtain the resource identified by that title.

While the user is entering the address or title, the user interface 700 may facilitate the user's identification and selection of the desired address or title by displaying a number of interface elements in the index field 730 for selection and actuation by the user. The interface elements may comprise reduced screenshot images of resources matching the data entered in the input field 710. The screenshot data may have been obtained during a current or previous session, in the manner described above. For example, in FIG. 7A, the address "http://www.t" has been entered in the input field 710. The client application therefore retrieves all URIs or other addresses that match this string of letters, which may include all URIs having a second-level domain name or a subdomain name with "t". In one embodiment, the input field 710 may be modified to comprise a drop-down list (not shown) including all recently-visited addresses or titles beginning with the same string; the recently-visited addresses or titles may be those accessed during the current client application session, or earlier, over a longer period of time. The addresses or titles may be stored and retrieved from volatile or persistent memory at the client device 100.

As can be seen in FIG. 7A, the index field 730 comprises a set of interface elements 740a . . . l representing recently-visited webpages 500 or other resources corresponding to the addresses or titles matching the string. The elements 740a . . . l may be arranged in an order based on predefined criteria. For example, the elements may be arranged alphabetical order according to their corresponding addresses or titles; in order of timestamp (i.e., from most recently accessed to least recently accessed); in order of frequency of access, if data relating to the frequency or number of times each of the corresponding resources has been accessed is maintained at the device 100, or listing "favourites" of the user first, if the application stores data on resources that the user has indicated as favourites or that the user appears to prefer based on browsing habits. The predefined criteria may be based on external factors as well, such as the relative popularity of various resources, according to metrics assessed externally, for example by third-party services, and provided to the device 100 over the network. Upon detection of the string entered in the input field 710, the interface elements 740a . . . l may be generated by identifying the appropriate screenshots in the client device memory using a query constructed using the string, retrieving the screenshots from memory, and constructing the elements 740a . . . l such that they are associated with the address or title corresponding to the resource from which the screenshot was captured. In an alternative embodiment, the images 740a . . . l may be generated using cached resource data and cached associated embedded content 606, 608. When a selected one of the interface elements 740a . . . l is actuated by the user, for example by moving focus to the selected element using one of the input subsystems 112 and actuating the element in focus by pressing a button on the device keyboard, actuating another input device, or where the display 110 is a touchscreen display, by clicking on or tapping the selected element or by means of some other gesture in relation to the element, the client application may initiate a request to be transmitted over the network to retrieve that associated resource for display on the device 100.

If a large number of corresponding resources are identified, not all may be displayable within the single view of the display 110; for example, in FIG. 7A, interface elements 740d, 740h, and 740l are only partially displayed on the display 110. While sufficient portions of images in the interface elements 740d, 740h, and 740l may be displayed in this view to allow the user to ascertain whether that resource is the resource sought, the user interface 700 may be scrollable to allow the user to pan through the entire array of interface elements 740a . . . l. In alternative embodiments, the interface elements 740a . . . l may be scaled so that all of them fit within the display 110, although if a large number are retrieved the images in the interface elements 740a . . . l may be too small to be recognizable to the user. Thus, in a further alternative, for practical purposes a limit on the number of interface elements displayed in the index field 730 may be imposed; this provides a practical solution not only for the user, who may find it time-consuming or unnecessary to scroll through a large number of interface elements associated with addresses matching the short string entered in the input field 710, but also reduces the operational overhead of the client device 100, since fewer images need to be retrieved from the device memory. Alternatively, instead of limiting the number of interface elements to a fixed number, the number of interface elements may be limited to only those that had been previously accessed during a predetermined window of time, using the timestamps stored on the device 100.

As additional characters are entered into the input field 710, the user interface 700 may automatically refine the query to retrieve and display images associated with webpages or documents having addresses or titles matching with the address or title as altered. For example, in FIG. 7B, additional characters have been added to the address in the input field 710, which now reads "http://www.tech". As a result of the narrower query, fewer interface elements 750$a$ . . . $i$ are generated and displayed in the index field 730. These interface elements 750$a$ . . . $i$ typically will be a subset of the previously displayed 740$a$ . . . $l$ interface elements, although if the client application is configured to limit the number of elements displayed in the index field 730, it is possible that once the query is refined, interface elements that were not previously displayed among 740$a$ . . . $l$ will be displayed among 750$a$ . . . $i$. Again, the images in the elements 750$a$ . . . $i$ may be scaled to fit within the display 110 of the client device 100, or they may be displayed such that the user may scroll the user interface 700 to view other interface elements that lie wholly or partially off the viewable area of the display 110. Because fewer matching addresses or titles matching the string entered in the input field 710 have been found, the interface elements 750$a$ . . . $i$ may be rendered in a larger size than they were in the previous view shown in FIG. 7A, thus signifying to the user that fewer matching results have been found. Also, as described with regard to FIG. 7A, a limit on the number of images retrieved and displayed may be imposed.

Figure 7C:
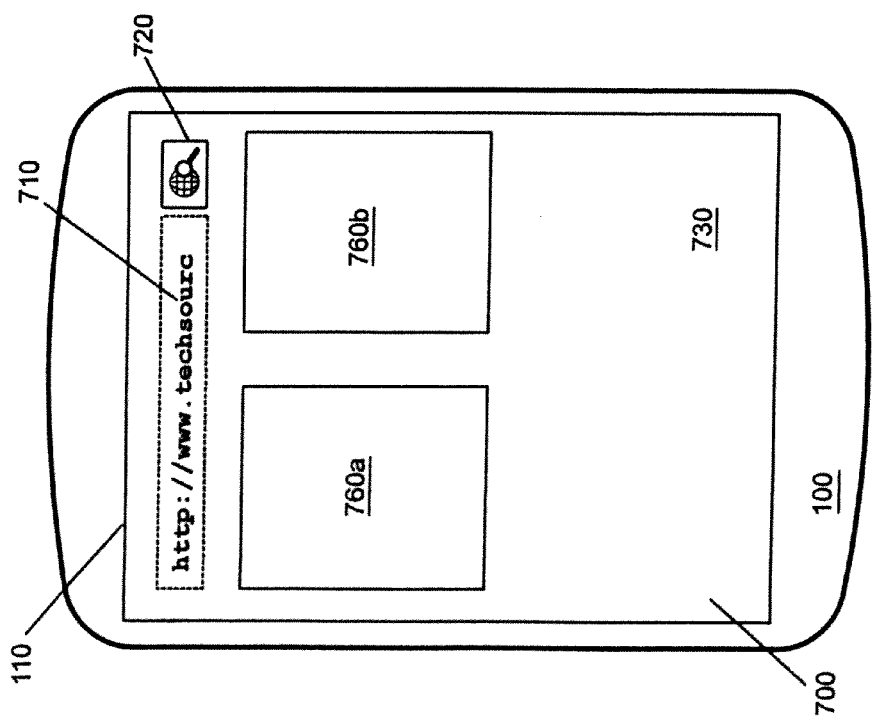

As still further characters are entered into the input field 710, the user interface 700 continues to refine the query to generate and display interface elements associated with resources having addresses or titles matching the input data. In FIG. 7C, only two interface elements 760$a$, 760$b$ are displayed in the index field 730, as a result of fewer matches to the address in the input field 710, now reading "http://www-.techsourc". Again, for the reason explained above, these two interface elements 760$a$, 760$b$ may or may not be a subset of the interface elements 740$a$ . . . $l$ or 750$a$ . . . $i$. These interface elements 760$a$, 760$b$ may be displayed in a larger size, since there are no other images associated with an address or title matching the input address string. At any stage, however, the user may select and actuate any one of the interface elements 740$a$ . . . $l$, 750$a$ . . . $i$, or 760$a$, 760$b$. The client application may then load the resource corresponding to the address or title associated with that interface element, as described below. This method of automatically retrieving and displaying images in interface elements in response to data input in the input field 710 provides a convenient method for users to locate a desired resource visually, rather than relying on recollection of the address at which the resource is located.

Figure 8:
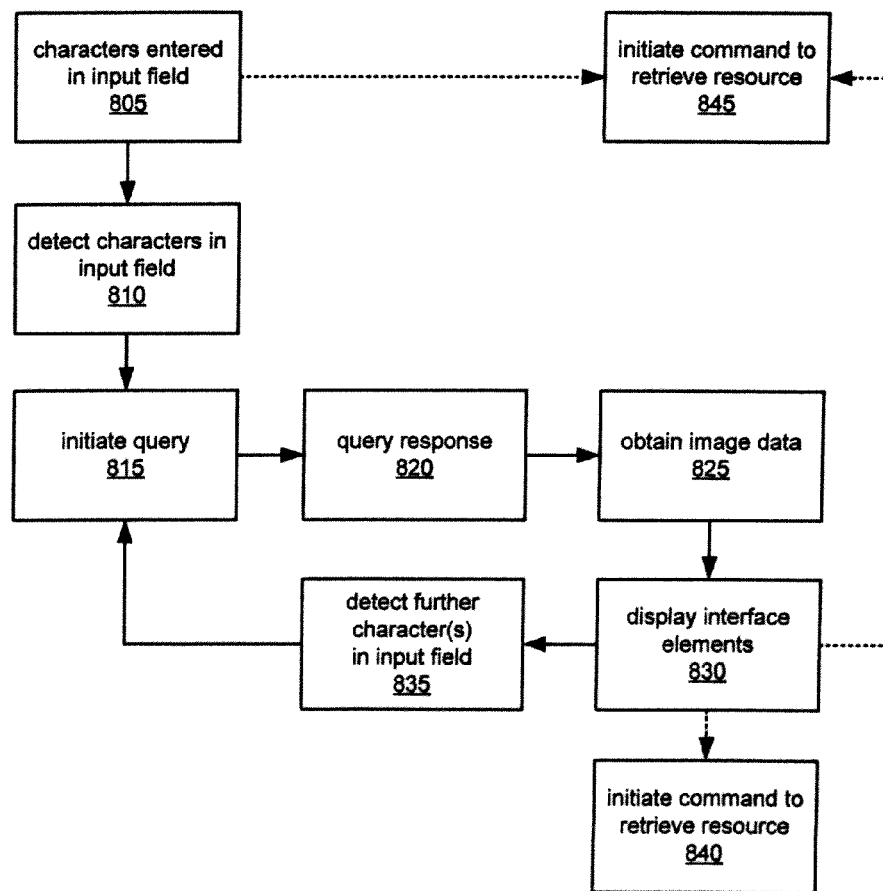
FIG. 8 is a flowchart depicting a method for displaying interface elements relating to previously accessed resources.

The process of displaying interface elements in response to data entry in the input field 710 is illustrated in the flowchart of FIG. 8. At 805, one or more characters are initially entered into the input field 710 of the user interface 700. At 810, the client application detects that characters have been entered into the input field 710, and initiates a query of a memory store on the device 100 to find cached data or screenshot data corresponding to an address matching the characters input so far at 815. The client application may be configured to only initiate the query once it detects that sufficient content has been entered in the input field 710 to execute a meaningful query; for example, in a web browser application, searching for the partial string "http://" will likely not yield meaningful results, as most of the webpages recently visited by the user may include that string. Thus, the client application may be configured to wait until further characters have been entered; or, alternatively, the client application may be configured to execute the query regardless of the number of characters entered in the input field 710, but not to proceed to display results unless the number of matches returned in response to the query is less than a predetermined number. The query may be performed on the array of data 600 described above or on a similar data structure that associates address strings with resource data, whether this data is the cached resource data or a stored screenshot. The query may be executed by the client application itself, or by another application executing on the client device 100.

The response to the query is returned at 820. The response may comprise the full address matching the address string currently entered in the input field 710, together with a pointer or address identifying the associated screenshot data, or the associated cached resource data and any associated embedded content. The client application then obtains image data to use in the interface element for display in the index field 730 at step 825. In one embodiment, the image data is obtained from the screenshot data retrieved from memory. In another embodiment, the cached resource data and associated embedded content, if available, is rendered for display as a thumbnail image in interface element in the index field 730. In either embodiment, the client application may only obtain image data for up to a certain number of query results matching the address string, for example only up to a predetermined number corresponding to the number of interface elements that can be displayed in the index field 730 without being too small to be comprehensible to the user, or too numerous to be convenient to scroll through. The interface elements are then displayed in the index field 730 at step 830. This may include scaling the interface elements to fit the available area of the display 110. The obtaining of image data at 825 and the displaying step of 830 may be executed concurrently; for example, as soon as some image data is available in step 825, the client application may commence generating and displaying the interface elements in the index field 730. This improves the response time experienced by the user. If, at 825, it is determined that image data for a matching address is not available from memory, at 830 the client application may either display a placeholder image or a blank area in the interface element for that resource in the index field 730, optionally also displaying the full address or URI of the relevant resource. Alternatively, the client application may simply omit any placeholder or blank area in the index field 730.

At 835, the client application detects that a further character or characters have been entered in the input field 710. The process then returns to 815, where a query is executed; the client application then receives the response to the query at 820, and proceeds to retrieve image data relating to the matching addresses returned in the response at 825, and to display the retrieved images in interface elements at 830. This loop continues as long as further characters or characters are detected at step 835. If a query returns no results (for example, because the user has entered an address never visited before using the client application, or because any potentially matching cached data or screenshot data has been deleted from memory), then the index field 730 may be blank. During any loop of the process, the user may focus on and/or actuate any one of the interface elements once they are displayed at 830, thus initiating a command to the client application to retrieve the resource associated with the interface element, at 840. Also during any loop of the process, the user may actuate the interface element 720, or actuate another input means, with the effect of initiating a command to the client application to retrieve the resource using the address string currently entered in the input field 710, as shown at 845. Although the initiating step 845 is shown in FIG. 8 to be following the entry of characters in the input field 805 or after interface elements are displayed 830, the initiating step 845 may be carried out at any other time during the process.

Figure 9:
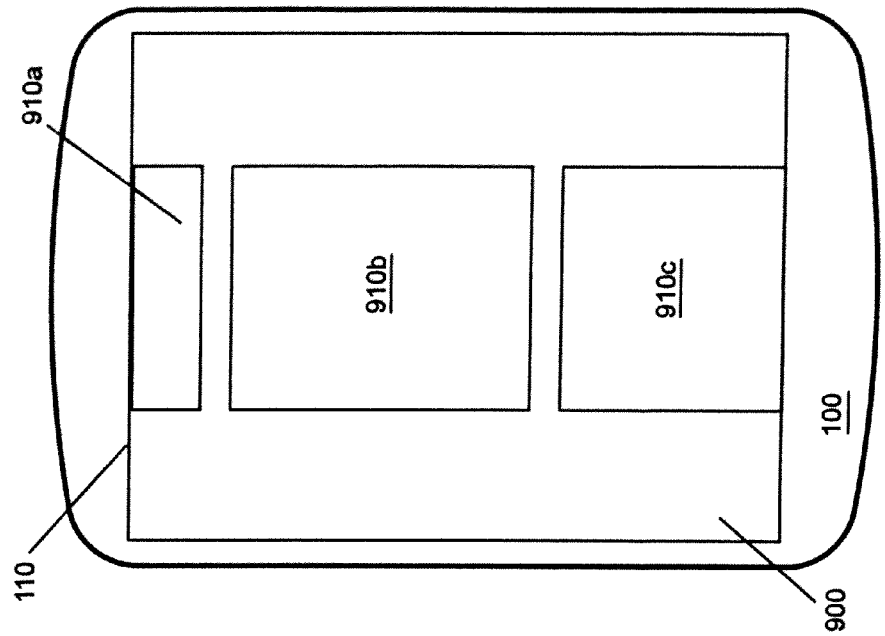
FIG. 9 is a schematic representation of a further user interface displaying interface elements relating to previously accessed resources.

The stored screenshots may also be used to provide enhanced browsing of resources on the client device 100. Turning to FIG. 9, the display 110 of the client device 100 shows a user interface 900 for a client application, including a number of elements 910a, 910b, and 910c. For ease of reference, three elements are shown, although more or less than three elements may be shown in the display 110. The user interface 900 presents the user with a number of interface elements representing recently accessed resources, for example, webpages visited during a current browsing session using the client application. The interface elements may also represent resources that were accessed prior to the current session.

The user interface 900 may be invoked upon an express user command. Alternatively, it may be automatically invoked upon detection of a user action. For example, if the client application is a web browser, in typical usage the application accesses resources such as webpages from device memory 106, 108 or over the network, and displays the resources on the display 110, typically at "normal" or 100% size, that is to say, displayed at a scale and in a position determined by style and/or formatting instructions incorporated within or associated with the webpage as accessed and on the screen resolution of the display 110. Typically, when a resource such as a webpage is first downloaded and rendered for display on the client device 100, it is first displayed at this normal or 100% scale, and such that the upper left-hand corner of the webpage is located at an upper left-hand corner of the display 110, for example as illustrated in FIG. 5B(i). The user may have the option of scaling the webpage on the display 110, to "zoom in" to a specific area of the page, thereby enlarging or magnifying it in the display 110 to a scale that is therefore greater than 100%, or to "zoom out" to reduce the overall size of the webpage as rendered in the display 110, such that it is displayed at a scale less than 100%. The client application may be configured to invoke the user interface 900 whenever the user invokes a command to zoom out of a view of the resource to a scale of less than 100%. For example, if the resource in the current view is being viewed at a normal scale, upon detection of a user command to zoom out of the view, the user interface 900 may be automatically invoked to display at least one interface element, where one element, such as element 910b, comprises a screenshot image representing the resource that had just been viewed.

It will be appreciated that if the previously rendered and displayed webpage is replaced with the interface element 910b, then the user may no longer be able to interact with the resource, but only with the interface element 910b. Resources such as webpages may comprise hyperlinks or other interface elements that may be actuated by the user to access other resources and to navigate through the resource; but if the content displayed at the device is replaced with the screenshot image in the interface element 910b, those hyperlinks will no longer be present in the interface element 910b. Instead, the user will only be able to interact with the interface element 910b itself, as described below. Therefore, in an alternative embodiment, upon detection of a user command to zoom out of the current view, the client application may continue to display the resource as rendered, although at a smaller scale, such that the hyperlinks and other elements within the resource remain actuatable; but upon detection of a user command to zoom out of the resource to a size below a predetermined threshold (for example, to a scale less than 75%), the client application may replace the displayed resource with the interface element 910b. In still a further embodiment, regardless of the scale of display of the resource, the client application may continue to render and display the resource itself in the interface 900, rather than replacing it with a screenshot in interface element 910b. The client application may override hyperlinks and other elements in the resource to render them inactive when the resource is displayed below the predetermined threshold.

Figure 10:
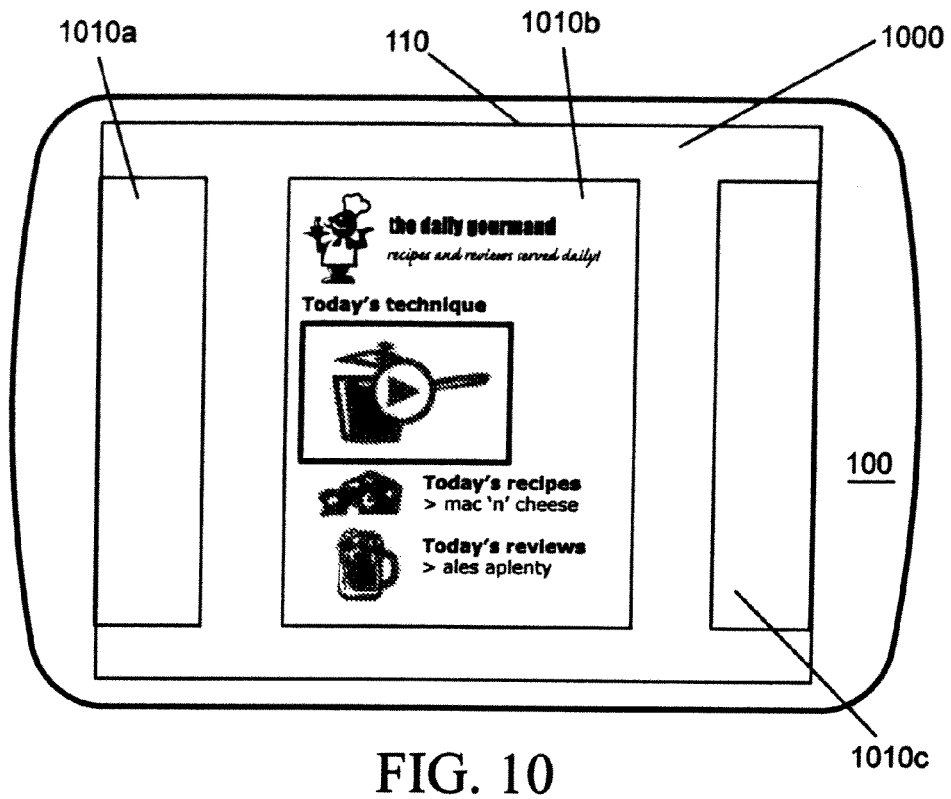
FIG. 10 is a still further schematic representation of a user interface similar to that of FIG. 9.

As mentioned above, the user interface 900 may display a number of elements 910a, 910b, 910c, which may be arranged in a row, column, or array on the display 110. In an initial view, one of the elements, such as 910b, may be fully displayed on the screen 110; depending on the relative size and spacing of the other elements 910a, 910c, they may be only partially visible on the display 110. The user interface 900 may be scrollable, so that the user may fully view the other elements 910a or 910c. As the user interface 900 is scrolled, additional interface elements corresponding to other previously viewed resources (not shown) may be loaded and displayed on the screen 110. The user interface 900 may thus operate in a manner that presents elements in a "film roll", either vertically as shown in FIG. 9, or horizontally as shown in FIG. 10. The direction of scrolling—vertically or horizontally—may be determined by the orientation of the display 110 of the client device 100. In FIGS. 9 and 10, the direction of scrolling may be parallel to the longer dimension of the display 110. However, the direction of scrolling may be perpendicular to this dimension, or even at oblique angles.

If the interface elements 910a, 910b, 910c comprise images representative of the recently viewed resources, i.e., screenshots, and the screenshot data is currently stored in RAM 106, then the client application may retrieve the screenshot data from RAM 106 first. If the screenshot data is not available from RAM 106, but is stored in persistent memory 108, then the client application may retrieve the data from the persistent memory 108, although the response time in retrieving the data may be longer. If lower-quality and smaller file size images corresponding to the screenshots are also stored in memory 106, 108, those lower-quality images may be retrieved from memory and displayed first, since they would generally be loaded, rendered and displayed faster.

The user interface 900 provides an enhanced browsing experience by predicting user requests for resources based on user-triggered events. For example, the user interface 900 may detect user browsing actions or changes to user browsing actions such as scrolling, moving focus, pausing (hovering), and zooming. While the user is scrolling through the elements 910a, 910b, 910c and additional elements subsequently loaded and displayed in the interface 900, it may be determined that the speed at which the user is scrolling is decreasing. Upon detection of the decrease in scrolling speed in the user interface 900, the client application may predict that a given element (such as 910a) will be displayed in approximately the center of the user interface 900 once scrolling stops, if scrolling speed continues to decrease at the same rate. Accordingly, the client application may presume from this prediction that the user will either initiate a command to zoom into the image shown in that interface element 910a, or request access to the resource corresponding to that particular element 910a, or both, and may therefore automatically initiate a task to retrieve a higher-quality version of the screenshot from memory for display, automatically initiate a request for that resource (for example, by transmitting an HTTP request for the associated address), or both, even before the user has stopped scrolling, or before the user has invoked a specific command to zoom into the element 910 or request its associated resource. It will be appreciated by those skilled in the art that if the prediction is accurate, user experience may be enhanced because the perceived load time of the higher-quality image or of the resource may be decreased.

Similarly, the client application may predict that if the user moves focus in the user interface 900 to one of several elements displayed in the interface 900, or invokes a command to zoom into that element, the user will likely invoke a command to retrieve the resource associated with that one element; the client application may therefore automatically initiate the request to retrieve the resource before the user actually invokes the command.

The client application may also detect other browsing actions within the user interface 900 to cancel (if possible) requests for resources, if it turns out that the prediction was incorrect. For example, the user may slow down or pause in scrolling through the user interface 900 to inspect a given element 910a, 910b, 910c; or, the user may invoke a command to zoom into the element. This may result in the client application initiating a request for a higher-quality screenshot image to replace the lower-quality image displayed in the element, or a request for a resource associated with that element. However, the user may then continue scrolling, increasing the scrolling speed, or invoke a zoom out command once he or she determines that the associated resource is not the one that he or she wishes to retrieve. Accordingly, the client application may cancel, or attempt to cancel, the request previously initiated for that image or resource.

Figure 13G:
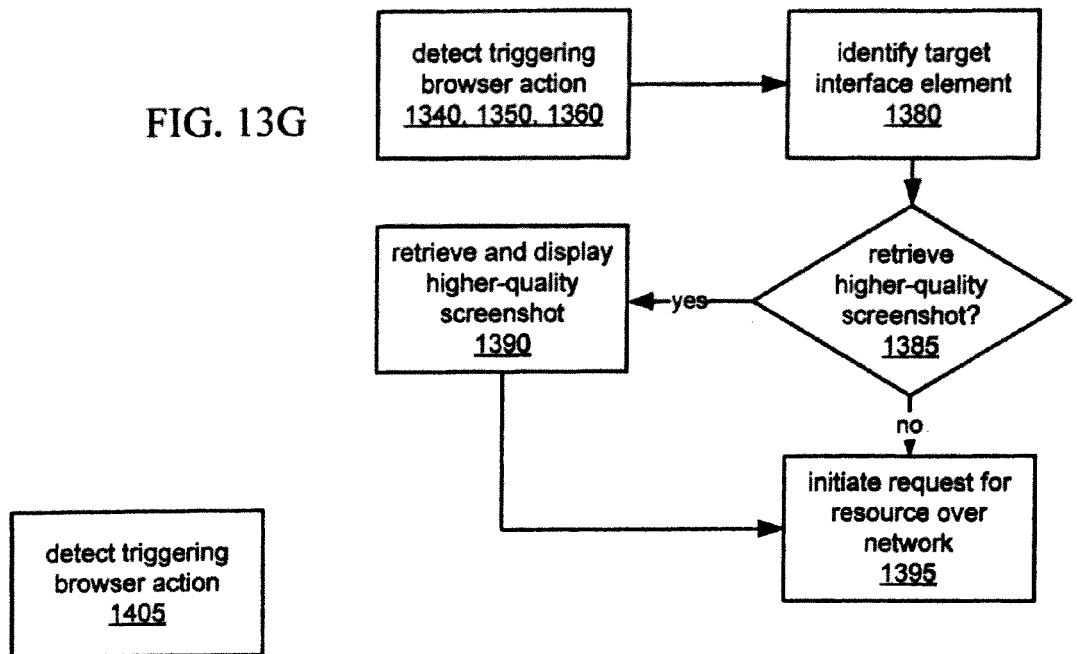
FIG. 13G is a flowchart depicting a further method for initiating a request for a resource or a higher-quality screenshot in response to a browsing action.

These steps are illustrated in FIGS. 13A through 13G. Turning to FIG. 13A, the client application may initially be in a state 1305 in which a currently viewed resource is displayed in the display 110, for example zoomed in such that it is displayed at greater than 100% scale. The client application may then detect at 1310 a browsing action such as a zoom out command, invoked by the user, which triggers the initiation of the user interface 900. An element corresponding to the currently viewed resource is then loaded at 1315. The element may comprise a screenshot of the resource as it was last rendered and displayed on the device 100. Thus, for example, in response to detecting the zoom out command invoked by the user at 1310, the client application or operating system 134 may immediately store a screenshot of the resource in RAM 106 for use in the user interface 900. The screenshot data may be compressed to reduce the amount of memory required to store the image in RAM 106, and both the compressed and an uncompressed or higher-quality version of the screenshot data may be retained in RAM 106, and later transferred to storage in persistent memory 108. The client application may then immediately proceed to display the element comprising this screenshot 1325, by executing the zoom out command by displaying the screenshot in place of the previously rendered resource on the display 110, while scaling the screenshot to the target size associated with the zoom out command. This scaled screenshot may thus be displayed as element 910b in FIG. 9. The screenshot may subsequently be stored to persistent memory 108. If at 1305 the currently viewed resource was viewed at 100% scale or less, then the element corresponding to the currently viewed resource may already be stored in memory, and accordingly the loading step at 1315 need not occur after detection of the zoom out command at 1310.

The client application may then proceed to load 1320 and display 1325 further elements 910a, 910c representing other recently accessed resources in the user interface 900 at 1320. These elements may be generated from screenshot data currently stored in RAM 106, since screenshots of the recently accessed resources, as they were rendered on the display 110, may have been captured during the current client application session. The screenshot data used to generate the elements 910a, 910c may have been compressed as described above. Alternatively, the screenshots may be retrieved from non-volatile memory 108 if they are not available from RAM 106. Although the foregoing description provides that the first element 910b is displayed at 1325 prior to the retrieval of other screenshots at 1320, it will be appreciated that the display of element 910b may be executed concurrently with, or following, the retrieval of the other screenshots at 1320.

Once the user interface 900 has been initiated, additional data may be loaded from memory, or resources requested over the network, in response to browser actions. Turning to FIG. 13B, when a scrolling command is detected at 1330 (i.e., the user scrolls through the user interface 900 to view additional images of recently accessed resources), the client application loads additional elements corresponding to other recently accessed resources from device memory at 1335. Again, the elements are generated from screenshot data associated with these recently accessed resources, and may be retrieved form RAM 106. If they are not available from RAM 106, then they may be retrieved from non-volatile memory 108. The client application may then interpret changes in user scrolling commands as a predictor of a request for a particular resource. As shown in FIG. 13C, if the client application detects that the user's scrolling speed is decreasing 1340, the application determines what the expected target element or associated resource will be at 1342. The target element may be the next element that will be displayed in the user interface 900, or the element that is estimated will be displayed in the user interface 900 once scrolling stops, based on the rate of decrease of the user's scrolling. The target resource is the resource associated with the target element. The application then initiates a request at 1346 for the target resource. Thus, if the user does invoke a command to retrieve the resource associated with this target element, for example by moving focus in the user interface 900 to that element and actuating a virtual or physical interface element or input subsystem 112 to invoke a retrieval command, the amount of time taken to retrieve the resource over the network potentially will be shorter than if the request had not been initiated until after the user's invocation of a retrieval command.

Other browser actions may also initiate a predictive action by the client application to request a resource over the network. For example, in FIG. 13D, the client application may detect that the user has paused, or is "hovering", over a particular element in the user interface 900 at 1350. The user may have been scrolling through elements in the user interface 900 at a relatively constant speed, but then stopped scrolling; or, the client may have moved focus from one element to another in the user interface 900. At 1352, the client application may then identify the target element that is currently positioned in the most central location in the display 110 (in the example of FIG. 9, element 910b is the most centrally located), and its associated resource, or identify the target element in focus and its associated resource, and predict that the user may next invoke a command to access this resource. The client application will therefore initiate a request for that resource at 1356. As another example, as shown in FIG. 13E, the user may invoke a zoom in command at 1360 to increase the size of the image displayed in the element so that further detail can be seen. The client application identifies the target element and its associated resource that is the subject of the zoom in command at 1362, and if a request for the resource associated with that element had not already been initiated, the client application may then initiate the request for the associated resource at 1366.

If the client application makes use of both lower-quality or compressed screenshot images and higher-quality screenshot images, additional retrieval steps may be taken in response to the detection off a triggering browser action such as 1340, 1350, or 1360. Turning to FIG. 13G, once the browser action has been detected, the target element is identified at 1380, and it is determined at 1385 whether it is necessary to retrieve a higher-quality screenshot image. For example, the client application may be configured such that if the element currently displays a lower-quality image and the triggering browser action is a decrease in scrolling speed or a zoom in command, the client application will determine it to be necessary to load a higher-quality screenshot image because it is likely that the next user command will be to view the image in the element in more detail before issuing a command to access that resource over the network. If the triggering browser action is a detected hover over the target element, the client application may determine that it is likely the next user command will be to access the resource, in which case it may not be necessary to load the higher-quality image. Thus, if it is determined that it is necessary to retrieve a higher-quality screenshot image, the client application obtains the data from persistent memory 108 if necessary and loads a copy into RAM 106, and renders and displays the higher-quality image in place of the previous lower-quality image at 1390. Otherwise, the client application initiates a request for the target resource over the network at 1395. The client application may also initiate the request at 1395 after retrieving and displaying the higher-quality screenshot at 1390.

Other browser actions may result in the cancellation of the predictive action. For example, in FIG. 13F, a request for a resource or for a higher-quality screenshot may have already been initiated by the client application based on a prediction that the user would invoke a command to access that resource, based on the user's detected behaviour (by hovering over an element in the user interface 900, by zooming into the element, and so forth). However, the user may then invoke a different command indicating that the user is unlikely to attempt to access the resource or view the target screenshot in more detail. For example, if the user had zoomed into the element, the user may then invoke a command to zoom back out; or, if the user had paused or slowed down in scrolling through elements in the user interface 900, the user may resume scrolling or increase scrolling speed. If an action of this type in respect of a given element in the user interface 900 is detected at 1370 after the initiation of a request for the resource or higher-quality screenshot associated with that element, then the client application may attempt to cancel the previously transmitted request at 1375, if possible under the protocol used to implement the request. Alternatively, if cancellation of the previous request is not possible, the client application may simply discard the data received in response to the previous request.

In the foregoing cases, the request for the resource may be a request for the resource itself, a conditional request for the resource if it had not changed since the last time the resource had been accessed, or for other status information to allow the client application to make a determination whether a fresh copy of the resource needs to be obtained from the server. Furthermore, while the above prediction of user requests for resources based on user-triggered events were described in the context of the user interface 900 of FIG. 9 or a similar interface, it may also be implemented in the context of the index field 730 in the user interface 700 of FIGS. 7A, 7B, and 7C.

Figure 11:
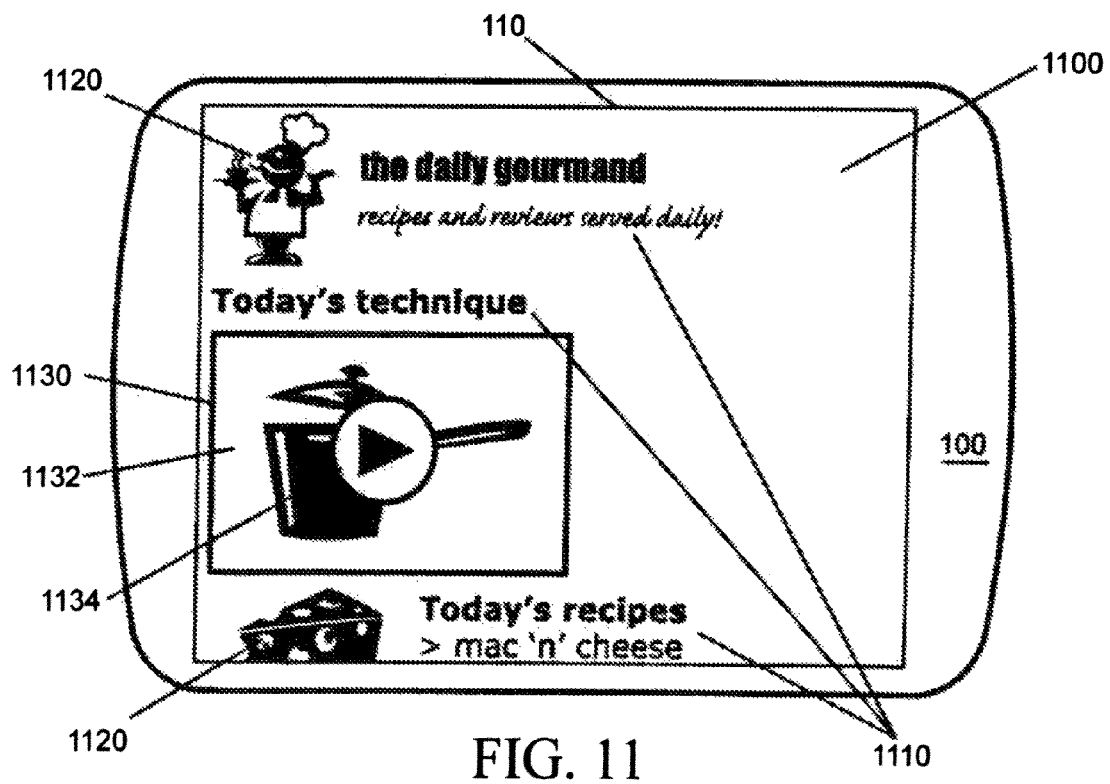
FIG. 11 is an illustrative embodiment of a resource displayed at 100% scale on a client communication device.

The screenshots of recently accessed resources and cached resource data comprising structured content, such as HTML pages or other structured documents and accompanying formatting or style information, may also be used to improve the perceived response time or loading time when a user selects a resource for downloading over the network. Referring to FIGS. 5A and 11, examples of the same webpage resource as it may be rendered at 100% scale in the display 110 of a client device 100 is shown. Similarly to the webpage 500 of FIG. 5A, the webpage 1100 of FIG. 11 comprises a number of embedded image objects 1120, text and hyperlink content 1110, and an embedded video object 1130. When initially retrieved by the client device 100, the entirety of the graphic objects 1120 may be downloaded to the device 100, but the video object may not be downloaded at all. Instead, only a still graphic 1132 and an interface element 1134 are downloaded and rendered in the webpage 1100. All or some of these various objects and content may be actuatable by the user. For example, if the user wishes to view the embedded video 1130, he or she would actuate the interface element 1134 to initiate a request to a server for the video content, which may be delivered by downloading or streaming.

Figure 12:
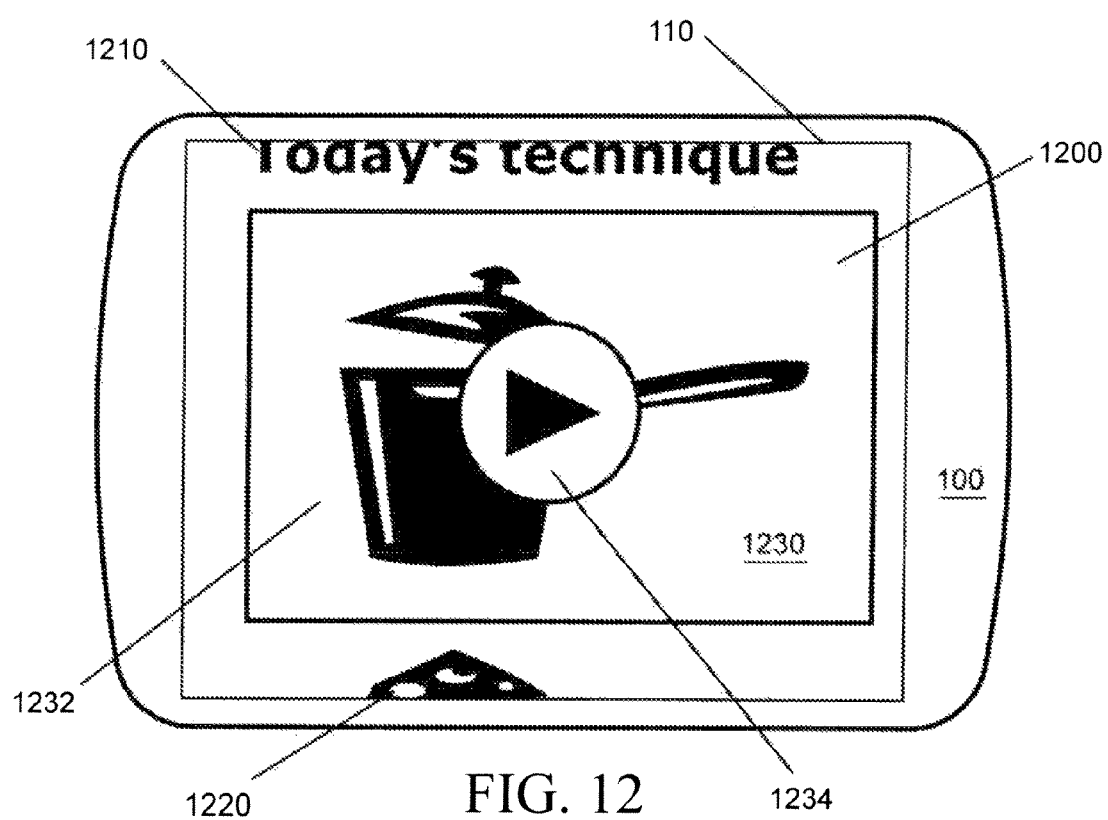
FIG. 12 is an illustrative embodiment of the resource of FIG. 11 displayed in a magnified view.

The user may wish to zoom into a particular feature or object on the webpage 1100, such as the embedded video 1130. In so doing, the client application will obtain a rendering of the webpage 1100 at a scale greater than 100%, and display this to the user via the display 110. Since the webpage 1100 is displayed in a magnified view, only a portion of what was previously viewable in FIG. 11 will be viewable in the magnified view. As shown in FIG. 12, a magnified view of the webpage 1200 shown in display 110 comprises the embedded video object 1230, as represented by the still image 1232 and the interface element 1234; a portion of an image object 1220, and a portion of text content 1210 are also displayed in this magnified view 1200 of the webpage. These image and text portions were previously viewable in their entirety in the 100% view of FIG. 11. This magnified view may be captured in a screenshot and stored in RAM 106 and/or persistent memory 108, as described above.

During the course of a browsing session, the user may view this portion of the webpage 1200 in this magnified view, and then may browse away from that webpage, accessing and displaying other resources. As a result, while the screenshot of the magnified view of the webpage 1200 and even screenshots of other views of the webpage 1100 may be retained in memory at the device 100, a rendered version of the resource may no longer be available in memory. Later in the session, or in a subsequent session, the user may wish to return to this webpage and in particular to the magnified view 1200. If the webpage itself, and any of its embedded objects, had been cached during the session or a previous session, the client application may retrieve the cached webpage and objects, and render the webpage from the cached data. However, while there may be cached resource data stored in RAM 106 or persistent memory 108, that data may be stale, as the resource data may since have been updated at the server from which the resource was originally obtained. Accordingly, a new request for the resource may be transmitted over the network to determine whether any changes have been made to the resource or its embedded objects.

However, if the user wishes to only view a portion of the resource, such as the previously magnified view, waiting for updated information regarding the resource and all of its embedded objects to be received over the network may result in an unnecessary delay from the user's point of view, since the user is only interested in viewing a portion of the webpage 1200 and is not interested in obtaining updates of other elements of the page. Accordingly, the client application may selectively initiate requests for embedded objects and resources in response to browser actions, using cached resource data to determine which requests to make.

As described above, interface elements comprising screenshots may be displayed in a number of user interfaces such as the user interface 700 of FIG. 7A, 7B, or 7C, displaying interface elements 740*a* . . . *l*, 750*a* . . . *i*, or 760*a*, 760*b*, and the user interface 900 of FIG. 9, displaying interface elements 910*a*, 910*b*, and 910*c*. A browser action operating on one of these elements may be one of the actions described above, such as the zoom in command, which may be invoked by the user by manipulating one of the input subsystems 112 of the device 100, such as a trackball, trackpad, or keyboard, or by means of tapping or some other contact or gesture on the display 110, if the display 110 is a touchscreen; as described above, the client application may predictively initiate retrieval of the resource associated with the interface element upon detection of such a browser action. The browser action may be an express command to retrieve the resource associated with a target interface element, which may be invoked by the user in a similar manner. The target interface element may be generated from a screenshot of a magnified view of a resource, such as the magnified view of the webpage 1200 shown in FIG. 12; thus, if the user initiates a browser action in respect of such an element, the user may likely wish to retrieve and view the resource in the same magnified view again, so the client application may predictively (in response to a browser action such as a zoom in command) or responsively (as a result of an express command to retrieve the resource) retrieve and render the resource data to directly display the magnified view of the resource.

In a further embodiment, the target interface element may be generated from a screenshot of an unmagnified view of the resource, such as a webpage displayed at 100% or smaller scale. In that case, a browser action such as a zoom in command to enlarge the view of the target element to greater than 100% scale may also automatically trigger the client application to retrieve and render the resource data to directly display the magnified view of the resource.

Figure 14:
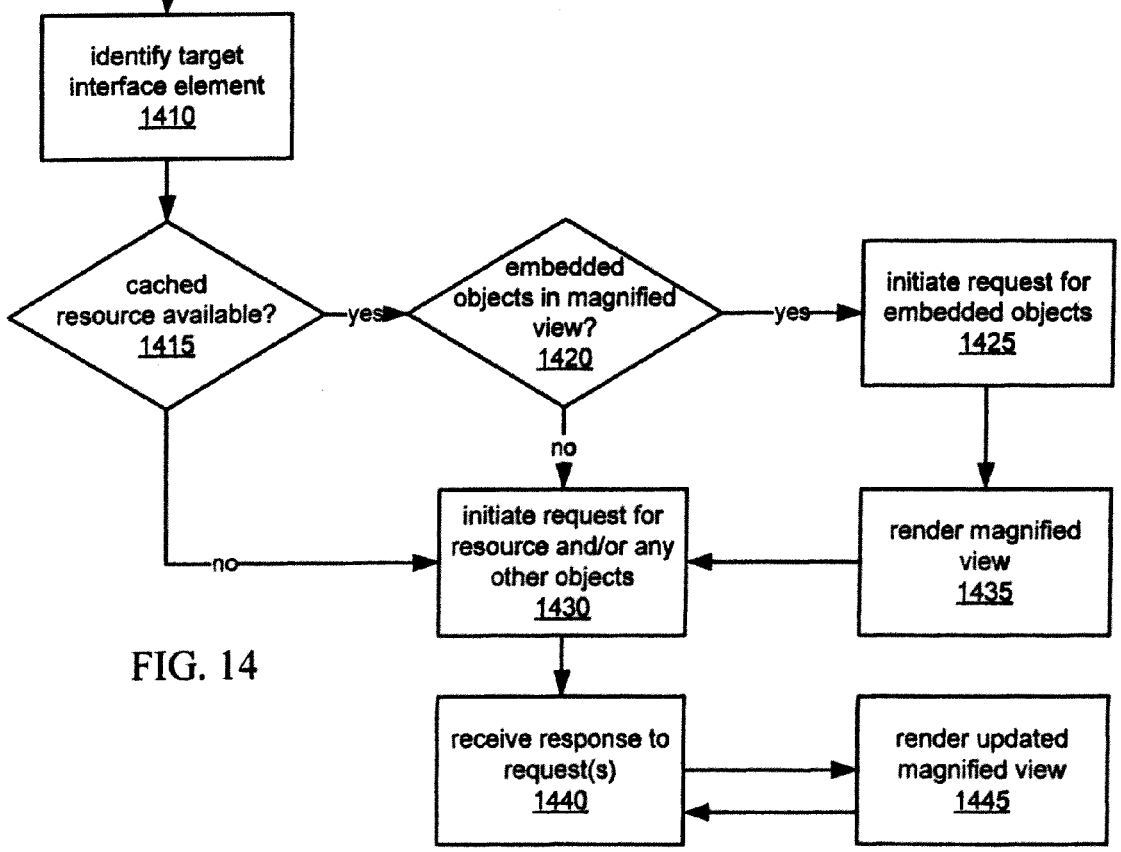
FIG. 14 is a flowchart depicting a method for selectively requesting objects in response to a browsing action.

Thus, with reference to FIG. 14, when a triggering browsing action such as those described above is detected at 1405, the target interface element that is the subject of the browser action is identified at 1410. At 1415, the client application determines whether cached data for the resource associated with the target interface element is stored at the client device 100. If there is no cached data—for example, in the case of a webpage resource, if there is no cached HTML data—then the client application may initiate a request for the resource and any objects embedded in the resource at 1430. If, however, there is cached resource data, then at 1420 the client application determines whether there are any embedded objects in the particular portion of the resource rendered in magnified view 1200.

The presence of embedded objects in the magnified view 1200 may be determined with reference to the cached resource data. In one embodiment, the client application and rendering or layout engine 125 may determine, from the magnification factor of the zoom in command and cached resource data, how the cached webpage may be rendered in the display 110, and from the structure and layout of the cached webpage, determine which embedded objects will be visible in the display.

In another embodiment, when the screenshot data is captured, positional information regarding the magnified view 1200 is also stored. The positional information may simply comprise one or more (x, y) positions, measurable in pixels or using another suitable unit of measurement, within the rendered webpage 1100, and a value representing the magnification of the magnified view 1200. If the magnified view 1200 had been displayed in the entirety of the device display 110, then at least one (x, y) position may be stored, such as the upper left-hand corner of the view when displayed on the display 110. Referring to FIG. 5B, the (x, y) position at points 560*i* or 560*iv* may be stored; the x and y directions may be arbitrarily set along the two dimensions of the display 110, as shown by the x-y axis in FIGS. 5A and 5B. If the magnified view 1200 had not been displayed in the entirety of the device display 110—for example, if it had been displayed in a window that did not occupy the entire display 110—then additional (x, y) positions, such as points 562*i*, 564*i*, and 566*i* as shown in FIG. 5B(i), may be stored along with the magnification value. In the case where the magnified view 1200 had been offset, such as in FIG. 5B(iv), some of the additional (x, y) positions may include negative values to denote the offset. In FIG. 5B(iv), 560*iv*, 562*iv*, and 566*iv* may have one or two negative (x, y) values, while 564*iv* would not. With this (x, y) and magnification information, the client application may retrieve the cached resource data and parse the structured content contained therein, together with any cached ancillary formatting or style information (such as a cascading style sheet) using the rendering or layout engine 125 to identify objects within the cached resource and their relative location when rendered for the device display 110, and to identify specifically those objects that would be rendered in the magnified view 1200 because they would fall within the viewable area defined by the (x, y) and magnification information. In the case of a resource comprising a structured document such as an HTML page, the rendering or layout engine 125 may thus effectively render the cached HTML page, without the rendered HTML page being displayed. This technique may also be applied to other resources without the same document structure as HTML, such as image files; the client application would not identify objects within the magnified view 1200, but rather a subset of the image data.

In another embodiment, when the screenshot data is captured, data identifying the embedded objects displayed in the magnified view 1200 is stored at the same time. It is more efficient to store this data at the time of screenshot capture, since the screenshot is captured at a time when the webpage 1100 or other resource has already been rendered for display. Thus, in the example of FIG. 12, when the screenshot of the magnified view 1200 is captured, the client application may identify, using the rendering or layout engine 125, which objects are located in the viewable area of the magnified view 1200, and may store data identifying those objects. In FIG. 12, the identifying data may include identifiers for the embedded video 1230, which may also include data identifying the still image 1232 and the interface element 1234, as well as the image object 1220, since a portion of that image object is visible on the display 110. The identifying data may be taken from the webpage HTML document itself, and may comprise the URI for each of the objects.

If no embedded objects are identified as being present in the magnified view 1200, then the client application proceeds to initiate a request for the resource and any objects associated with the resource at 1430. If there are embedded objects identified in the magnified view 1200, then the client application initiates a request over the network for those specific embedded objects at 1425, before any request for an updated version of the resource itself, or any other objects. The client application, using the rendering or layout engine, at 1435 then renders and displays the magnified view 1200 using either the existing screenshot of the magnified view 1200—in which case the user will be unable to manipulate or actuate any elements shown in the magnified view 1200, since it is a static image—or the cached resource and associated object data retrieved from the memory of the device 100. Thus, by this point, the user will be able to look at a representation of the magnified view 1200 of the webpage. Although the content may be stale, loading the screenshot or rendering the cached resource data may provide the user with the impression that the resource has been accessed over the network and displayed faster than if the client application had merely initiated a request for the resource over the network after zooming into a screenshot of the magnified view 1200.

The client application may then initiate a request for an updated version of the resource itself, or for any other objects embedded in the resource, at 1430. Once a response has been received to the initial request for any embedded objects present in the magnified view 1200, as indicated at 1440, the client application and the rendering or layout engine 125 may use the response to refresh or update the magnified view 1200 with current data at 1445. The response received may simply be an indicator that there has been no change to the object since the time the screenshot was captured and/or the resource data was cached, or it may comprise updated object data, which may be the same or different than the cached information. If there was in fact no change to the embedded objects in the magnified view 1200, then when the magnified view 1200 is updated at 1445, the user may not see any change to what is displayed. If there has been a change to the embedded objects, then the user may see a change at 1445 when the magnified view 1200 is updated. In one embodiment, if the response at 1440 indicates that there has been a change to the embedded objects shown in the magnified view 1200, the client application may wait for the remaining resource data to be received over the network, re-render the webpage 1100, then replace the screenshot or cached magnified view 1200 with a view of the webpage 1100 at 100% scale, since the original object data is no longer available over the network.

In the meantime, responses may be received to the other requests for updated resource or object data at 1440. Once responses to other requests have been received, the client application may again refresh the magnified view 1200 at 1445. Although changes to other objects that are not visible in the magnified view 1200 will not have any effect when the magnified view 1200 is refreshed, the updated data will be useful for rendering other portions of the webpage 1100 should the user invoke a command to view another portion of the page. If there is a change to the webpage structure or formatting as a result of an updated resource file received at 1440, then this may have an effect on the magnified view 1200 when it is refreshed at 1445. In that case, the client application may re-render the entire webpage 1100, and replace the magnified view 1200 with a view of the webpage 1100 at 100% scale.

By using the foregoing method, the client application thus makes requests for resources and embedded objects based on a prediction or estimation of the content that is most important to the user, requesting updates to content that will be displayed in the magnified view 1200 first, rather than in an order determined by a default traversal of the webpage HTML structure from top to bottom. It is not necessary for the client application to wait until updated data for all objects has been downloaded over the network to re-render the magnified view 1200 of interest to the user.

Figure 15:
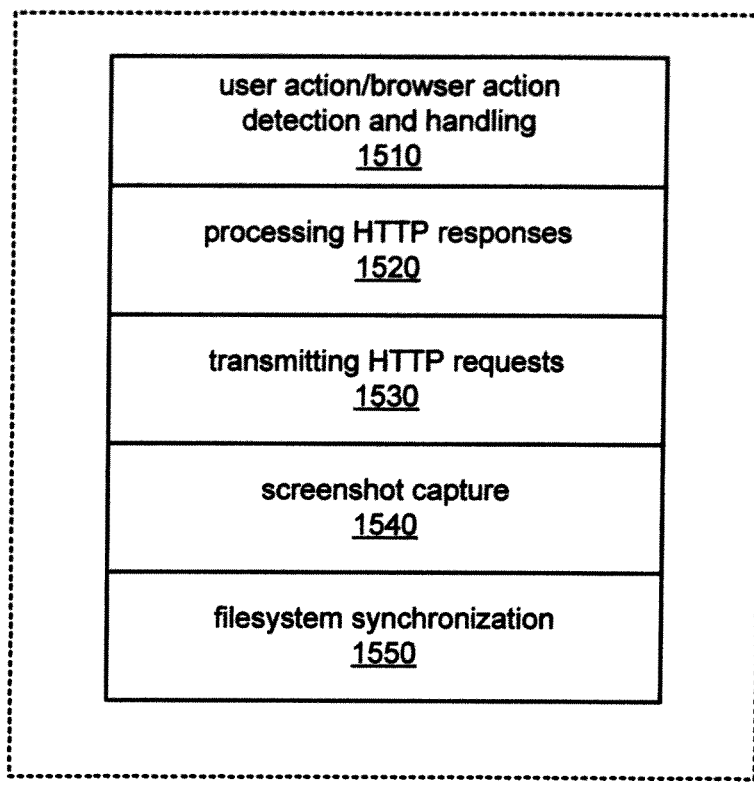
FIG. 15 is a schematic diagram illustrating a series of prioritized browser-related tasks.

To further enhance the perceived responsiveness of the client application and the device to the user when accessing resources over the network, the client application and operating system 134 may be configured to prioritize tasks as shown in FIG. 15 if those tasks cannot be run concurrently. The detection and handling of user actions and commands 1510, such as the browser actions described above, are accorded the highest priority, since the results of handing these actions and commands may affect other scheduled tasks and events, impacting the responsiveness of the client application and the device 100 generally to the user's commands. For example, as described with reference to FIG. 13F above, a browser action may have the effect of cancelling a request for a resource to be accessed over the network or cancelling a request for a higher-quality screenshot to be loaded from persistent memory.

The processing of responses received over the network, such as HTTP responses 1520, are accorded the next highest priority. In addition to the fact that processing of the HTTP response may be needed to respond to a previous user command, thus mandating higher priority to improve responsiveness to user commands, failure to process received HTTP responses may result in a buffer overflow if all received HTTP responses are queued in a buffer in RAM 106, or loss of data if older buffered HTTP responses are overwritten by newer responses.

HTTP requests 1530 are handled as third-highest priority, after any user commands or buffered HTTP responses have been handled. HTTP requests may be queued until high priority tasks have been handled. Although prompt transmission of HTTP requests is a significant factor in reducing the perceived load time of resources at the client device 100, user commands 1510 and processing of HTTP responses 1520 may still require higher priority; as noted above, subsequent user commands or browser actions 1510 may have an effect on previous HTTP requests, and received HTTP responses may be in response to earlier user commands or browser actions.

Screenshot capture 1540 may be handled as the fourth-highest priority, since the perceived responsiveness of the client application to a user command or browser action does not depend on the speed or timing of the capture itself.

Finally, filesystem synchronization 1550 of screenshot and cached data between RAM 106 and persistent memory 108, which may be handled by the operating system 134, is accorded lowest priority. Also, synchronization, when it does occur, may run in the background whether or not a current client browsing application session is running, and may be easily interruptible so that the device can handle higher priority tasks.

Thus, the foregoing provides a method implemented at a communication device comprising displaying a plurality of interface elements, each interface element being associated with a resource; then, in response to a browsing action operating on one or more of the plurality of interface elements, identifying one of the plurality of interface elements as an object of the browsing action, and initiating a request over the network for the resource associated with said one of the plurality of interface elements, prior to receipt of an instruction to retrieve said resource over the network. In a further aspect, each interface element comprises a screenshot representation of the associated resource. In still a further aspect, the browsing action comprises one of: a command to magnify one of the plurality of interface elements, a decrease in scrolling speed in a user interface displaying the plurality of interface elements, or a movement of focus to one of the plurality of interface elements.

There is also provided a communication device adapted to predictively retrieve resources over a network, comprising: a display for displaying a plurality of interface elements, each interface element being associated with a resource; at least one input means for detecting a browsing action operating on one or more of the plurality of interface elements; a processor adapted to, in response to the detected browsing action: identifying one of the plurality of interface elements as an object of the browsing action; and initiate a request over a network for the resource associated with said one of the plurality of interface elements, prior to receipt of an instruction to retrieve said resource over the network. In a further aspect, each interface element comprises a screenshot representation of the associated resource. In still a further aspect, the browsing action comprises one of: a command to magnify one of the plurality of interface elements, a decrease in scrolling speed in a user interface displaying the plurality of interface elements, or a movement of focus to one of the plurality of interface elements.

The foregoing also provides a method implemented at a communication device, comprising: in response to a query comprising an input string, retrieving, from a data store at the communication device, image data representative of at least one resource as rendered for display at the communication device, each said resource being associated with an address corresponding to the input string; and displaying, in a single view at the communication device, a set of at least one interface element, wherein the set comprises, for each said resource, an interface element comprising an image generated from the image data representative of said resource, said interface element being actuatable to initiate a request over a network for the resource at its associated address. In a further aspect, data comprising image data representative of a plurality of resources is retrieved, such that a plurality of interface elements is displayed in the single view. In still a further aspect, the request is an HTTP request. In yet a further aspect, the at least one resource comprises a webpage.

There is also provided a communication device, comprising: a display; at least one input means for receiving an input string; and a data store for storing image data representative of at least one resource as rendered for display in said display, each of the at least one resource being associated with an address; a processor adapted to, in response a query comprising the input string, retrieve from the data store image data representative of at least one resource, each said resource being associated with an address corresponding to the input string; and display, in a single view on the display, the set of at least one interface element, wherein the set comprises, for each said resource, an interface element comprising an image generated from the image data representative of said resource, said interface element being actuatable to initiate a request over a network for the resource at its associated address. In a further aspect, data comprising image data representative of a plurality of resources is retrieved, such that a plurality of interface elements is displayed in the single view. In still a further aspect, the request is an HTTP request. In yet a further aspect, the at least one resource comprises a webpage.

The above embodiments also provide a method implemented at a communication device, comprising: receiving a command to load a resource for display at the communication device, such that only a portion of the resource is displayed at the communication device in a magnified view, the resource comprising a structured document; retrieving, from memory at the communication device, a cached copy of the resource; determining, using the cached copy of the resource, whether the portion of the resource to be displayed comprises any one or more embedded objects; transmitting, over a network, a request for said one or more embedded objects comprised in said portion prior to transmitting any request over the network for the resource or for further one or more embedded objects comprised in the resource; receiving, over the network, a response to the request for said one or more embedded objects comprised in said portion; and rendering and displaying said portion of the resource in the magnified view.

In a further aspect, the response to the request for said embedded objects comprises a response indicating that said embedded objects are the same as a cached copy of the said embedded objects stored in memory at the communication device, and rendering and displaying comprises rendering and displaying said portion of the resource in the magnified view using the cached copy of the resource and the cached copy of said embedded objects. In still a further aspect, rendering and displaying uses either the cached copy of the resource, or an updated version of the resource received in response to a request transmitted over the network for the updated version of the resource. In yet a further aspect, the portion of the resource to be displayed comprises one embedded object. Further, the method may also comprise displaying an element comprising a screenshot representation of the resource prior to receiving the command, wherein the screenshot representation is retrieved from the memory. In a further aspect, the screenshot representation is displayed at a reduced size. In yet a further aspect, the communication device comprises a touchscreen display, and the command comprises a gesture or touch action on the touchscreen.

There is also provided a communication device, comprising: a memory; a display; means for transmitting and receiving data over a network; and a processor adapted to: receive a command to load a resource for display such that only a portion of the resource is displayed in the display in a magnified view, the resource comprising a structured document; retrieve from the memory a cached copy of the resource; determine using the cached copy of the resource, whether the portion of the resource to be displayed comprises any one or more embedded objects; transmit a request over the network for said one or more embedded objects comprised in said portion prior to transmitting any request over the network for the resource or for further one or more embedded objects comprised in the resource; receive, over the network, a response to the request for said one or more embedded objects comprised in said portion; and render and display on the display said portion of the resource in the magnified view. In a further aspect, the response to the request for said embedded objects comprises a response indicating that said embedded objects are the same as a cached copy of the said embedded objects stored in the memory, and the processor is further adapted to render and display said portion of the resource in the magnified view using the cached copy of the resource and the cached copy of said embedded objects.

There is also provided a computer program product comprising a signal or program code bearing medium storing code which, when executed by a communication device, causes the device to carry out any of the foregoing methods.

The systems and methods disclosed herein are presented only by way of example and are not meant to limit the scope of the invention. Other variations of the systems and methods described above will be apparent to those in the art and as such are considered to be within the scope of the invention.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method, comprising:
caching data in memory of a communication device for a webpage displayed on a display screen by the communication device, the webpage including a plurality of embedded objects, the webpage being last displayed by the communication device in an enlarged view comprising at least one, but not all, of the plurality of embedded objects;
in response to a subsequent command to display the webpage, the communication device:
identifying the at least one of the plurality of embedded objects that was last displayed in the enlarged view;
initiating a first request over a network for data for each of the at least one of the plurality of embedded objects thus identified;
after initiating the first request, initiating at least a further request over the network for data for a remainder of the plurality of embedded objects,
the first request and the further request thus being transmitted in a different order than an order determined by a default traversal of a webpage structure of the webpage.

2. The method of claim 1, wherein identifying the at least one of the plurality of embedded objects that was last displayed in the enlarged view is carried out with reference to the cached data.

3. The method of claim 1, wherein the cached data includes a screenshot representation of the webpage.

4. The method of claim 3, further comprising, after initiating the first request:
while waiting for a response to the first request, displaying the screenshot representation of the webpage on the display screen.

5. The method of claim 1, further comprising:
receiving a response to the first request, the response comprising data for each of the at least one of the plurality of embedded objects thus identified; and
displaying the webpage using the data received in the response.

6. A communication device, comprising:
a memory;
a display screen;
at least one communications subsystem; and
a processor configured to:
cache data in the memory for a webpage displayed on the display screen, the webpage including a plurality of embedded objects, the webpage being last displayed by the communication device in an enlarged view comprising at least one, but not all, of the plurality of embedded objects;
in response to a subsequent command to display the webpage:
identify the at least one of the plurality of embedded objects that was last displayed in the enlarged view;
initiate a first request via the at least one communications subsystem for data for each of the at least one of the plurality of embedded objects thus identified;
after initiating the first request, initiate at least a further request over the network for data for a remainder of the plurality of embedded objects,
the first request and the further request thus being transmitted in a different order than an order determined by a default traversal of a webpage structure of the webpage.

7. The communication device of claim 6, wherein the processor is configured to identify the at least one of the plurality of embedded objects that was last displayed in the enlarged view with reference to the cached data.

8. The communication device of claim 6, wherein the cached data includes a screenshot representation of the webpage.

9. The communication device of claim 8, wherein the processor is further configured to, after the first request is initiated,
while waiting for a response to the first request, display the screenshot representation of the webpage on the display screen.

10. The communication device of claim 6, wherein the processor is further configured to:
receive a response to the first request, the response comprising data for each of the at least one of the plurality of embedded objects thus identified; and
display the webpage on the display screen using the data received in the response.

11. A computer program product comprising a non-transitory computer-readable medium having stored thereon computer-executable code which, when executed by a processor of a communication device having a memory and display screen, causes the communication device to:
cache data in the memory for a webpage displayed on the display screen, the webpage including a plurality of embedded objects, the webpage being last displayed by the communication device in an enlarged view comprising at least one, but not all, of the plurality of embedded objects;
in response to a subsequent command to display the webpage:
identify the at least one of the plurality of embedded objects that was last displayed in the enlarged view;

initiate a first request via the at least one communications subsystem for data for each of the at least one of the plurality of embedded objects thus identified;

after initiating the first request, initiate at least a further request over the network for data for a remainder of the plurality of embedded objects, the first request and the further request thus being transmitted in a different order than an order determined by a default traversal of a webpage structure of the webpage.

12. A method executed by a processor of a communication device, the method comprising:

initially receiving, over a network, a first webpage, the first webpage comprising an HTML document and a plurality of embedded objects;

caching data for the first webpage in memory of the communication device;

displaying a portion of the first webpage on a display screen of the communication device at an enlarged scale, the portion of the first webpage thus displayed at the enlarged scale comprising a subset of the plurality of embedded objects of the first webpage, a remainder of the plurality of embedded objects not being comprised in the portion;

after displaying the portion of the first webpage, displaying a second webpage in place of the first webpage;

subsequently receiving a command to re-display the portion of the first webpage, and response to the command, first transmitting, over the network, a request for the subset of the plurality of embedded objects comprised in the portion; then next transmitting, over the network, requests for the HTML document and the remainder of the plurality of embedded objects not comprised in the portion, the request for the subset of the plurality of embedded objects and the requests for the HTML document and the remainder of the plurality of embedded objects being transmitted in a different order than an order determined by a default traversal of a structure of the HTML document; and receiving, over the network, a response to at least the request for the subset of the plurality of embedded objects comprised in the portion.

13. The method of claim 12, further comprising re-displaying the portion of the first webpage upon receipt of the response to the request for the subset of the plurality of embedded objections comprised in the portion.

14. The method of claim 12, wherein the subset of the plurality of embedded objects of the first webpage comprises an embedded video object.

15. The method of claim 12, wherein the enlarged scale is greater than a 100% scale.

16. A communication device, comprising:
a memory;
a display screen;
at least one communications subsystem; and
a processor configured to:

initially receive, over a network, a first webpage, the first webpage comprising an HTML document and a plurality of embedded objects;

cache data for the first webpage in memory of the communication device;

displaying a portion of the first webpage on the display screen at an enlarged scale, the portion of the first webpage thus displayed at the enlarged scale comprising a subset of the plurality of embedded objects of the first webpage, a remainder of the plurality of embedded objects not being comprised in the portion;

after displaying the portion of the first webpage, displaying a second webpage in place of the first webpage;

subsequently receiving a command to re-display the portion of the first webpage, and response to the command, first transmitting, over the network, a request for the subset of the plurality of embedded objects comprised in the portion; then next transmitting, over the network, requests for the HTML document and the remainder of the plurality of embedded objects not comprised in the portion, the request for the subset of the plurality of embedded objects and the requests for the HTML document and the remainder of the plurality of embedded objects being transmitted in a different order than an order determined by a default traversal of a structure of the HTML document; and receiving, over the network, a response to at least the request for the subset of the plurality of embedded objects comprised in the portion.

17. The communication device of claim 16, wherein the processor is further configured to re-display the portion of the first webpage on the display screen upon receipt of the response to the request for the subset of the plurality of embedded objections comprised in the portion.

18. The communication device of claim 16, wherein the subset of the plurality of embedded objects of the first webpage comprises an embedded video object.

19. The communication device of claim 16, wherein the enlarged scale is greater than a 100% scale.

* * * * *

UNITED STATES PATENT AND TRADEMARK OFFICE
CERTIFICATE OF CORRECTION

PATENT NO. : 8,826,141 B2
APPLICATION NO. : 12/713983
DATED : September 2, 2014
INVENTOR(S) : Stefan Dimitrov Page 1 of 1

It is certified that error appears in the above-identified patent and that said Letters Patent is hereby corrected as shown below:

In the Specification:

Column 4, line 36, delete "form" and insert therefor --for a--;
Column 15, line 11, delete "referred to a" and insert therefor --referred to as a--; and
Column 30, line 36, delete "high" and insert therefor --higher--.

Signed and Sealed this
Tenth Day of March, 2015

Michelle K. Lee
*Deputy Director of the United States Patent and Trademark Office*